(12) United States Patent
Ozawa et al.

(10) Patent No.: US 9,074,898 B2
(45) Date of Patent: Jul. 7, 2015

(54) APPARATUS AND METHOD FOR PROVIDING POSITION INFORMATION SERVICE

(75) Inventors: Yumiko Ozawa, Kawasaki (JP);
Mitsuhiro Ueno, Kawasaki (JP);
Koichiro Kasama, Kawasaki (JP); Yuko Nakajima, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 205 days.

(21) Appl. No.: 12/730,620

(22) Filed: Mar. 24, 2010

(65) Prior Publication Data
US 2010/0248745 A1 Sep. 30, 2010

(30) Foreign Application Priority Data
Mar. 30, 2009 (JP) ................. 2009-082744

(51) Int. Cl.
| | |
|---|---|
| H04W 24/00 | (2009.01) |
| G01C 21/20 | (2006.01) |
| G01C 21/36 | (2006.01) |
| H04W 4/02 | (2009.01) |

(Continued)

(52) U.S. Cl.
CPC ............ *G01C 21/20* (2013.01); *G01C 21/3679* (2013.01); *H04M 1/72572* (2013.01); *H04M 2242/15* (2013.01); *H04M 2242/30* (2013.01); *H04M 2250/10* (2013.01); *H04W 4/02* (2013.01); *H04W 4/18* (2013.01); *H04L 67/18* (2013.01)

(58) Field of Classification Search
USPC .............. 455/457, 456.3; 701/16, 200, 207; 342/457, 995.19
See application file for complete search history.

(56) References Cited

U.S. PATENT DOCUMENTS

| | | | |
|---|---|---|---|
| 5,790,477 A | 8/1998 | Hauke | |
| 5,842,142 A * | 11/1998 | Murray et al. ................. | 701/16 |

(Continued)

FOREIGN PATENT DOCUMENTS

| | | |
|---|---|---|
| JP | 05-40161 | 2/1993 |
| JP | 2001-147126 | 5/2001 |

(Continued)

OTHER PUBLICATIONS

Japanese Office Action mailed Nov. 19, 2013 in corresponding Japanese Application No. 2009-082744.

(Continued)

*Primary Examiner* — Charles Shedrick
(74) *Attorney, Agent, or Firm* — Staas & Halsey LLP

(57) ABSTRACT

An apparatus for providing a position information service includes a position acquisition section for acquiring first position information of a current position; an input section for inputting search information related to a destination; an acquire section for acquiring, on the basis of the search information, destination alternative information including at least an alternative destination related to the destination and a second position information of the at least the alternative destination; an output section for outputting first screen information including the destination alternative information and position relation information between the at least the alternative destination and the current position, and, when one of the at least the alternative destination is selected, second screen information including the position relation information between the selected alternative information and the current position; and a display for displaying the first screen information and the second screen information.

22 Claims, 26 Drawing Sheets

(51) Int. Cl.
*H04W 4/18* (2009.01)
*H04L 29/08* (2006.01)
*H04M 1/725* (2006.01)

(56) References Cited

U.S. PATENT DOCUMENTS

| | | | |
|---|---|---|---|
| 6,526,275 B1 * | 2/2003 | Calvert | 455/418 |
| 6,662,016 B1 * | 12/2003 | Buckham et al. | 455/457 |
| 6,882,313 B1 * | 4/2005 | Fan et al. | 342/357.43 |
| 7,089,110 B2 * | 8/2006 | Pechatnikov et al. | 701/411 |
| 8,145,417 B1 * | 3/2012 | Chitre et al. | 701/400 |
| 2003/0191578 A1 * | 10/2003 | Paulauskas et al. | 701/200 |
| 2004/0021583 A1 * | 2/2004 | Lau et al. | 340/995.19 |
| 2005/0130680 A1 * | 6/2005 | Northcutt | 455/457 |
| 2006/0074549 A1 * | 4/2006 | Takahashi et al. | 701/207 |
| 2006/0116818 A1 * | 6/2006 | Chao et al. | 701/211 |
| 2008/0132251 A1 * | 6/2008 | Altman et al. | 455/457 |
| 2010/0292914 A1 * | 11/2010 | Vepsalainen | 701/200 |
| 2012/0158845 A1 * | 6/2012 | Baalu et al. | 709/204 |

FOREIGN PATENT DOCUMENTS

| | | |
|---|---|---|
| JP | 2003-299136 | 10/2003 |
| JP | 2004-040427 | 2/2004 |
| JP | 2004-294301 | 10/2004 |
| JP | 2004-333421 | 11/2004 |
| JP | 2009-036726 | 2/2009 |
| WO | 97/48025 | 12/1997 |

OTHER PUBLICATIONS

Japanese Office Action mailed Mar. 5, 2013 for corresponding Japanese Application No. 2009-082744.

* cited by examiner

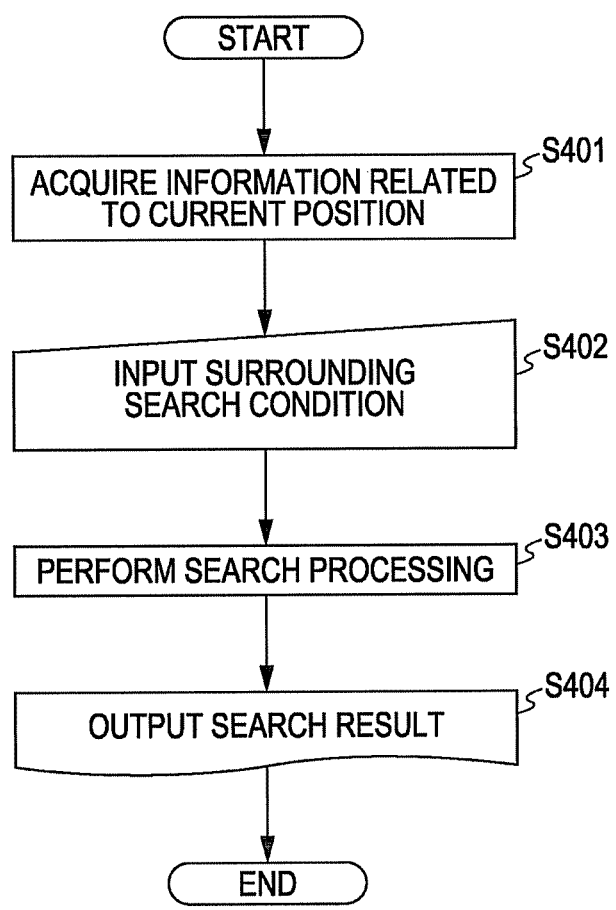

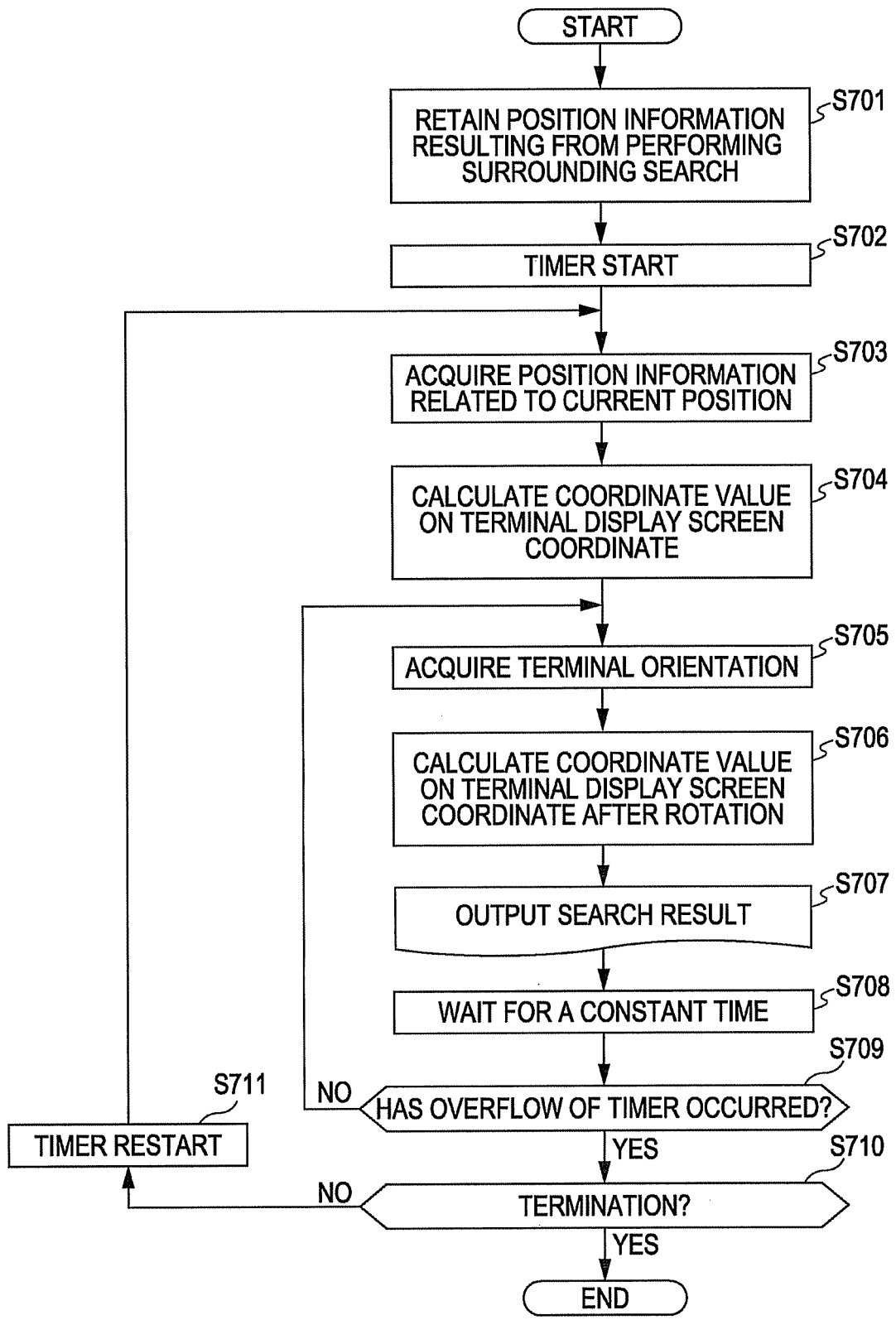

APPARATUS AND METHOD FOR PROVIDING POSITION INFORMATION SERVICE

CROSS-REFERENCE TO RELATED APPLICATION

This application is based upon and claims the benefit of priority of the prior Japanese Patent Application No. 2009-082744, filed on Mar. 30, 2009, the entire contents of which are incorporated herein by reference.

FIELD

The embodiments discussed herein are related to technologies which enable acquisition of position information and orientation information associated with a current position.

BACKGROUND

Recently, owing to miniaturization of global positioning system (GPS) receivers, functions of providing a position information service, in which, on the basis of detected longitude and latitude information associated with a current position, position relations between the current position and individual destinations are indicated and/or displayed, have been progressively incorporated in terminal devices, such as mobile telephones and mobile wireless information terminals.

Furthermore, owing to compact geomagnetic sensors which have been developed, it is possible to utilize information indicating an orientation which a user's terminal device, including the geomagnetic sensor incorporated therein, is facing. In addition, with respect to so-called third generation mobile telephones and the like, even though the GPS is not utilized, it is possible for base stations equipped over a wireless network to detect current positions of the mobile telephones, and the detected current position information, that is, position registration information, has been also actively utilized.

With respect to existing technologies which enable realization of provision of position information services achieved by combining a function of acquiring current position information, which can be achieved by using the GPS, and a function of acquiring orientation information, which can be achieved by using a geomagnetic sensor, the following technologies are well known to those skilled in the art.

With respect to a product resulting from implementation of a first existing technology, portable navigation devices are well known to those skilled in the art, in each of which a GPS receiver and a geomagnetic sensor are included, and on the basis of input position information related to a destination, a position relative to the destination and an orientation regarding the destination are calculated by associating the position and the orientation with a reference orientation, and the calculation result is displayed, and is also used for navigation.

With respect to a product resulting from implementation of a second existing technology, clocks are well known to those skilled in the art, in each of which a GPS receiver and an electronic compass configured to include a geomagnetic sensor or the like are included, and on the basis of input position information related to a destination, an orientation relative to the destination is displayed.

With respect to a product resulting from implementation of a third existing technology, mobile terminals are well known to those skilled in the art, in each of which either a circuit configured to acquire position registration information related to a current position of a target mobile terminal from a network, or a GPS receiver, further, a geomagnetic sensor, and a circuit configured to acquire position registration information related to a called party's mobile terminal from the network are incorporated, and a direction and a distance from a current position to the called party's mobile terminal are calculated and displayed.

With respect to a product resulting from implementation of a fourth existing technology, mobile terminal devices are well known to those skilled in the art, in each of which a GPS receiver and a geomagnetic sensor are included, further, a function of setting a destination on the basis of information obtained by using a guidance service for e-mail addresses or addresses and telephone numbers, or performing a Web search, or alternatively, a function of inputting longitude and latitude information is included, and a distance and a direction from a current position to a destination are displayed.

All the above-described technologies are ones which enable displaying or indicating not only a distance and a position relation relative to a destination, but also an orientation regarding a destination relative to a reference orientation at the current position.

In association with the above-described technologies, the following patent documents are disclosed.

Japanese Laid-open Patent Publication No. 05-40161, PCT Japanese Translation Patent Publication No. 2000-512014 (corresponding to International Publication Pamphlet No. WO97/48025), Japanese Laid-open Patent Publication No. 2004-40427 and Japanese Laid-open Patent Publication No. 2004-333421 are examples of related art.

However, the above-described first and second existing technologies prompt a user to explicitly input position information related to destinations from a terminal device thereof or the like, and further, do not disclose any technologies to realize a method in which acquisition of position information related to destinations is performed on the basis of, for example, names or telephone numbers of the destinations. Therefore, with respect to the above-described first and second existing technologies, there has been a disadvantage in that, in the case where the user knows the position information related to the destinations, the user utilize such a position information service that is provided by using the above-described first and second existing technologies.

Further, a target for application of a position information providing service realized by using the above-described third technology is limited to position information related to the called party's mobile terminal device. Therefore, there has been a disadvantage in that it is difficult to respond to requests from users who desire to know position information related to various destinations.

Moreover, for the above-described fourth technology, it is just stated vaguely that setting of destinations is performed on the basis of guidance services for e-mail addresses, addresses and telephone numbers, or Web searching. Therefore, there has been a disadvantage in that, for example, in the case where implementation of a function of setting position information related to destinations on the basis of names or telephone numbers of the destinations, or the like, is desired, it is difficult to specifically realize an apparatus or a method including a function to acquire position information specified by the setting.

Furthermore, there has been a disadvantage in that, even if the above-described first to fourth existing technologies are combined, it is difficult to achieve technologies for acquisition of position information related to destinations in accordance with information for searching, which users specify on the basis of information obtained by using various methods with the aid of recent sophisticated mobile terminals. Moreover, there has been a disadvantage in that, it is also difficult to achieve technologies for searching for position information related to destinations, which allow position information related a current position to be actively utilized, the position information being acquired by using the GPS or the like.

In any of the above-described existing technologies, there has been a disadvantage in that, it is difficult to effectively realize a series of display switchings, which are performed so that, in a format which allows users to easily understand directions towards destinations and distances to the destinations relative to a current position, a list of destinations is displayed on the basis of input searching information, and further, the details of a specific destination selected from among the listed destinations are displayed.

SUMMARY

According to an aspect of the invention, an apparatus for providing a position information service for displaying position relation information between a current position and a destination, includes a position acquisition section which acquires first position information of the current position; an input section which inputs search information related to the destination; an acquire section which acquires, on the basis of the search information, destination alternative information including at least an alternative destination related to the destination and a second position information of the at least the alternative destination; an output section which outputs first screen information including the destination alternative information and position relation information between the at least the alternative destination and the current position, and, when one of the at least the alternative destination is selected, second screen information including the position relation information between the selected alternative information and the current position; and a display which displays the first screen information and the second screen information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an operation flowchart of operations of surrounding facilities search processing according to an embodiment of the present invention;

FIG. 7 is a diagram illustrating an operation flowchart of operations of search result processing according to a second embodiment of the present invention;

DESCRIPTION OF EMBODIMENTS

Hereinafter, embodiments will be described in detail with reference to drawings.

Figure 1:
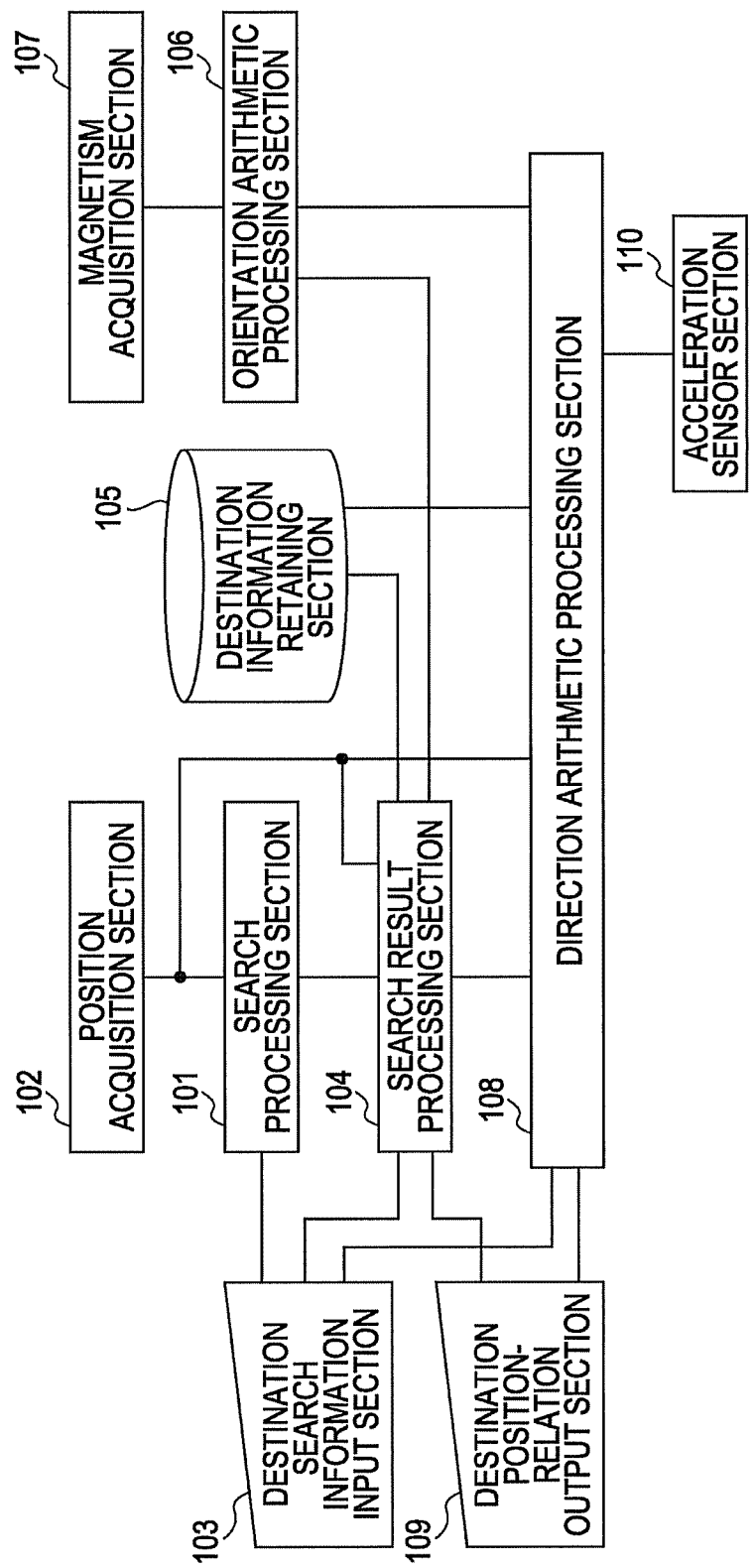
FIG. 1 is a diagram illustrating a configuration of an apparatus for providing a position information service according to an embodiment of the present invention.

FIG. 1 is a diagram illustrating a configuration of an apparatus for providing a position information service according to an embodiment of the present invention.

This apparatus includes a search processing section 101, a position acquisition section 102, a destination search information input section 103, a search result processing section 104, a destination information retaining section 105, an orientation arithmetic processing section 106, a magnetism acquisition section 107, a direction arithmetic processing section 108, a destination position-relation output section 109, and an acceleration sensor section 110.

Figure 2:
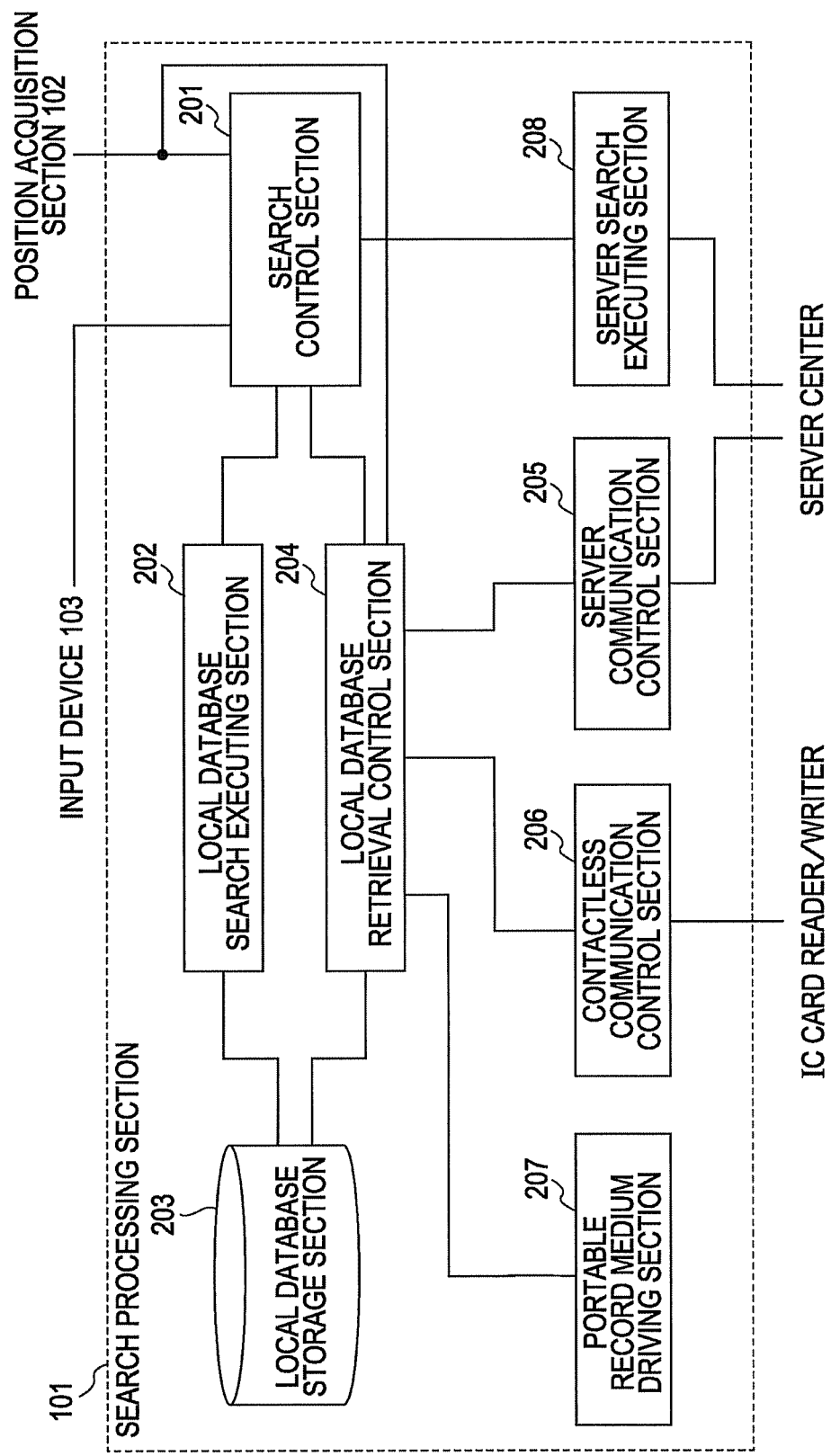
FIG. 2 is a diagram illustrating a configuration of a search processing section according to an embodiment of the present invention.

FIG. 2 is a diagram illustrating a configuration of the search processing section 101. The search processing section 101 includes a search control section 201, a local database search executing section 202, a local database storing section 203, and a server search executing section 208. Further, the search processing section 101 includes a local database retrieval control section 204, a server communication control section 205, a contactless communication control section 206, and a portable record medium driving section 207.

An apparatus for providing a position information service according to this embodiment can be incorporated in mobile terminal devices, such as mobile telephone terminal devices, mobile information terminal devices and portable navigation devices, and further, built-in automobile navigation devices.

Figure 3:
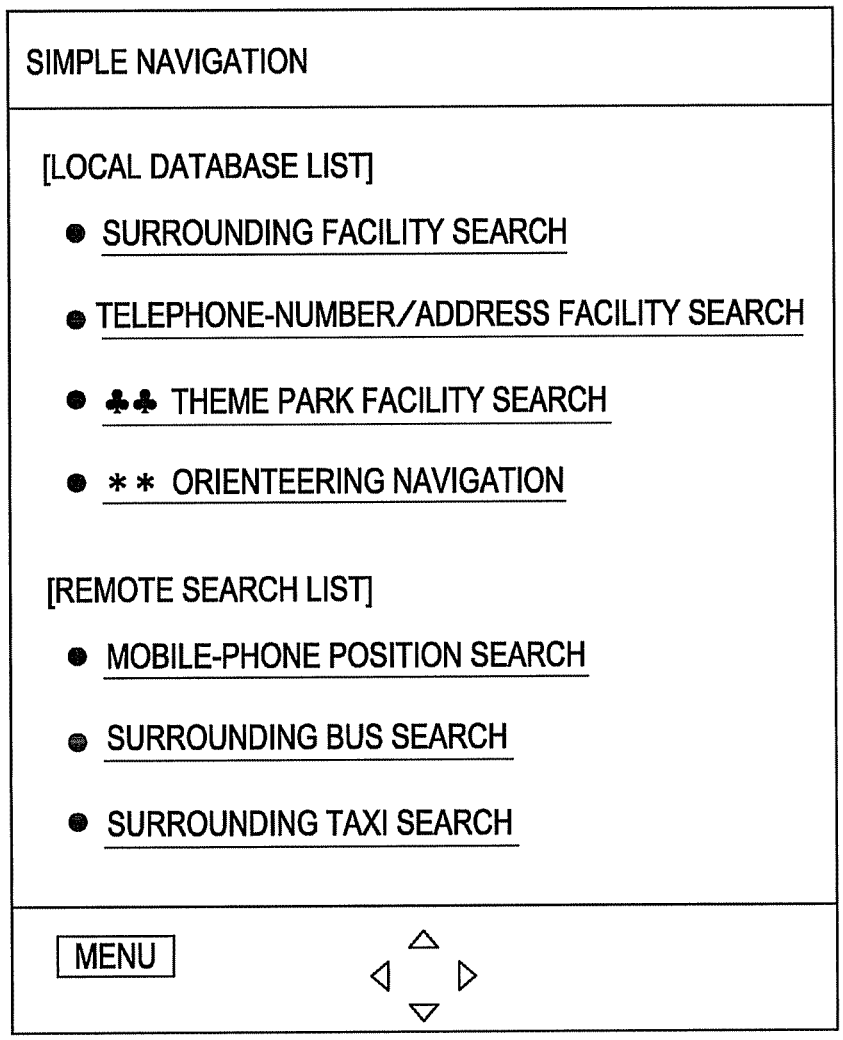
FIG. 3 is a diagram illustrating an example of a search menu display screen according to an embodiment of the present invention.

It is possible for users to select either one of search items for searching the local database storing section 203 or one of remote search items for searching a server center (a server device installed at a server center), by using, for example, a search menu display screen illustrated in FIG. 3, which is displayed on a touch panel, or the like, included in the mobile terminal device.

A list of contents of a local database, which is displayed on the search menu display screen illustrated in FIG. 3, can be displayed by, for example, causing the local database search executing section 202 to automatically acquire a list of contents of the local database, which is stored in the local database storing section 203. Further, in a way similar to that described above, a list of remote search items can be displayed by, for example, causing the server search executing section 208 to access the server center and automatically acquire a list of available search items.

Once a user selects "surrounding facilities search" from among the listed contents of the local database displayed on the menu display screen illustrated in FIG. 3 by performing a touch operation, or the like, the following processes starts.

FIG. 4 is an operation flowchart illustrating operations of surrounding facilities search processing performed by an apparatus for providing a position information service according to this embodiment.

In the surrounding facilities search processing, firstly, the position acquisition section 102 acquires position information (longitude and latitude information) related to a current position (in step S401 illustrated in FIG. 4). The position acquisition section 102 is, for example, a GPS receiver. Alternatively, the position acquisition section 102 may be a receiver configured to acquire position registration information regarding a certain mobile terminal device by performing communication with wireless base stations.

Next, a user inputs information for searching for destination facilities by using the destination search information input section 103 (in step S402 illustrated in FIG. 4). The destination search information input section 103 can be realized by, for example, a touch panel input device, a numeric key input device, a mouse key input device or a cursor key input device included in a mobile terminal device.

Figure 5A:
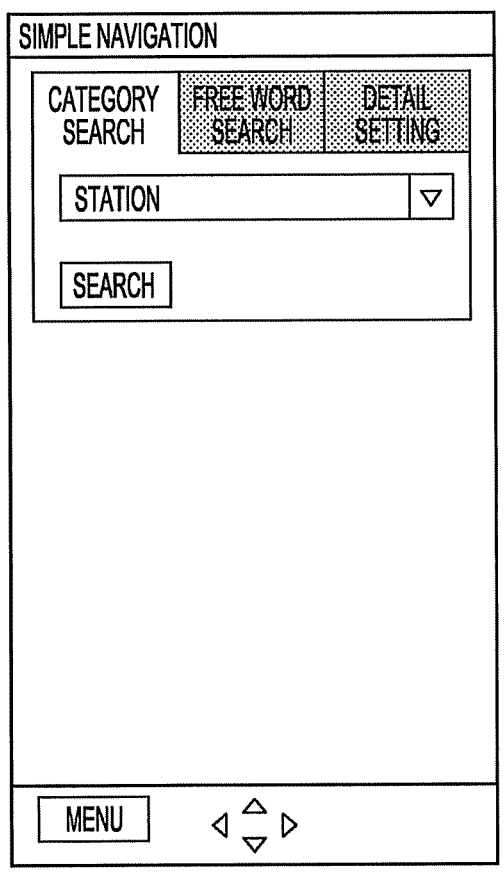
FIGS. 5A and 5B are diagrams respectively illustrating an example of a display screen for surrounding facilities search processing, according to an embodiment of the present invention.
Figure 5B:
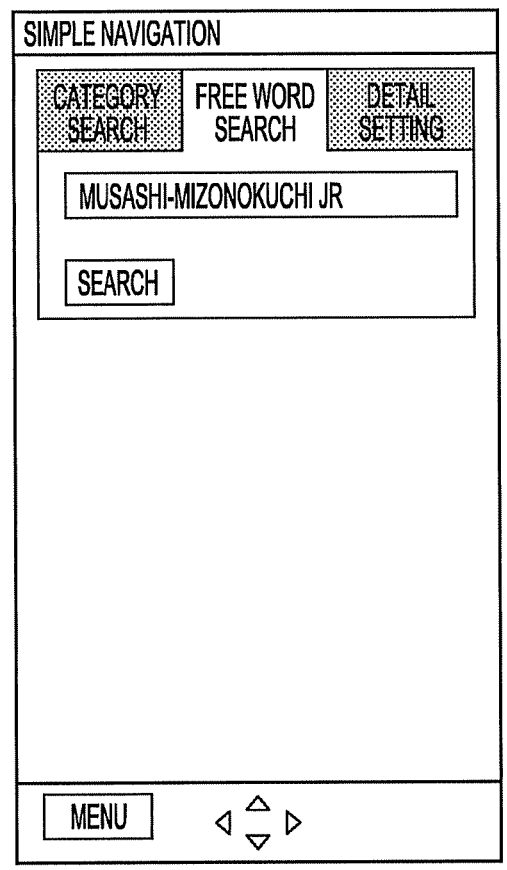

FIGS. 5A and 5B are diagrams respectively illustrating an example of a surrounding facilities search display screen, which is displayed immediately after an item denoted by "surrounding facilities search" is selected by the user from among the listed contents of the local database displayed on the menu screen illustrated in FIG. 3. The user can perform switching of the display screen to, for example, a display screen illustrated in FIG. 5A or FIG. 5B by performing a touch operation, or the like, on one of tab areas denoted by "category search", "free word search" and "setting of details" provided in the upper portion of the display screen. On the display screen illustrated in FIG. 5A, users can select a search category, such as "convenience store", "station", "hospital", or "supermarket" by using a pull-down menu. Further, on the display screen illustrated in FIG. 5B, users can freely input a name or the like of a target, which the user desires to search for, in a search box. Further, in the setting of details, the user can specify search words resulting from combination of a plurality of search conditions.

Next, the search processing section 101 executes processing for searching for longitude and latitude information related to destination facilities on the basis of the search information inputted from the destination search information input section 103 (in step S403 illustrated in FIG. 4). In this case, the search processing section 101 can operate to, for example, search for destination facilities within a predetermined range of distance from a current position by using position information having been acquired by the position acquisition section 102 in step S402 as search information.

More specifically, the search processing section 101 executes the following operations on the basis of the configuration illustrated in FIG. 2. On the surrounding facilities search display screen illustrated in FIG. 5A or FIG. 5B, once a user inputs search information and performs a touch operation, or the like, on a "search" button, as a result, the search control section 201 illustrated in FIG. 2 causes the destination search information input section 103 to enter a search category, a search word or the like, having been freely inputted by the user, and causes the position acquisition section 102 to enter longitude and latitude information related to a current position.

Next, the search control section 201 requests the local database search executing section 202 to perform search processing on the basis of the above-described search word and the longitude and latitude information.

Here, in the local database storing section 203, a database related to positions of facilities surrounding a current position is stored. In this local database storing section 203, for example, records, each corresponding to a facility, and including therein pieces of information, such as a name, the above-described search category, and a piece of longitude and latitude information, are stored.

The local database search executing section 202 searches the local database storing section 203 for records, for example, each of which includes a search category or a name the same as the above-described search category or the name, and further, longitude and latitude information within a predetermined distance range from the above-described longitude and latitude information. Further, the local database search executing section 202 notifies the search control section 201 of groups of names, search categories and pieces of longitude and latitude information regarding destination facilities, which are created from the searched records. In the case where this search has been successfully completed, as a result, the number of the groups is one or more than one.

The database to be stored in the local database storing section 203 can be obtained by, for example, causing the local database retrieval controller 204 to download pieces of data in advance from a server center via the server communication control section 205.

Further, the database to be stored in the local database storing section 203 can be obtained by causing the local database retrieval controller 204 to retrieve pieces of data in advance from an IC card reader/writer, which is an external device, via the contactless communication control section 206.

Moreover, the database to be stored in the local database storing section 203 can be obtained by causing the local database retrieval controller 204 to retrieve pieces of data in advance from a portable record medium, such as a memory card, a hard disk device, a CD-ROM disk device, or a DVD disk device.

Alternatively, the database to be stored in the local database storing section 203 can be obtained by causing the local database retrieval controller 204 to periodically transmit a request for relevant pieces of data to a server center, the request being created on the basis of longitude and latitude information related to a current position, acquired by the position acquisition section 102, and subsequently, download the requested pieces of data from the sever center. In this case, for example, it is possible to employ a method in which only records including pieces of information corresponding to longitude and latitude positions within a predetermined distance range from a current longitude and latitude position are sequentially downloaded.

In any of the above-described cases, since the type of data to be stored in the local database storing section 203 is text, it is possible to efficiently store a large amount of data therein.

In the case where, on the menu display screen illustrated in FIG. 3, a user selects an item by performing a touch operation, or the like, from among items which are listed in a list of contents of a local database, such as "♣♣ Theme Park Facility Search" and " Orienteering Navigation", a search input display screen just like the display screen illustrated in FIG. 5A or 5B is displayed. Subsequently, searching of the local database storing section 203** is performed. These processes will be hereinafter described in detail.

Further, in the case where, on the menu display screen illustrated in FIG. 3, for example, a user selects an item from among items included in a list of remote search items, a search input display screen just like the display screen illustrated in FIG. 5A or 5B is displayed.

Once a user specifies search words by using the search input display screen, the search control section 201 causes the destination search information input section 103 to enter the search words, and causes the position acquisition section 102 to enter longitude and latitude information related to a current position. Further, the search control section 201 requests the server search executing section 208 to perform search processing on the basis of the search words and the longitude and latitude information related to the current position.

The server search executing section 208 accesses a server center, and requests the server center to perform searching for information related to destinations on the basis of the search words and the longitude and latitude information having been notified from the search control section 201. The server search executing section 208 performs communication, for example, using the hyper text transfer protocol (HTTP) over a network employing the transmission control protocol/internet protocol (TCP/IP).

The server center performs searching for information related to destinations on the basis of the indicated search words and longitude and latitude information, and sends back groups of names, search categories, pieces of longitude and latitude information, regarding destinations for which hits have been obtained by the search. The server search executing section 208 notifies the search control section 201 of the sent-back groups of names, search categories, pieces of longitude and latitude information.

Search operations for each of search menus illustrated in FIG. 3, which are performed by the server center, will be hereinafter described in detail.

Subsequent to completion of the above-described search processes performed by the search processing section 101 illustrated in FIG. 1 (in step S403 illustrated in FIG. 4), the search result processing section 104, illustrated in FIG. 1, displays search results on the destination position-relation output section 109 (in step S404 illustrated in FIG. 4).

That is, the search result processing section 104 receives the groups of names, search categories and pieces of longitude and latitude information from the search processing section 101 and retains them in the destination information retaining section 105.

Further, the search result processing section 104 receives longitude and latitude information related to the current position from the position acquisition section 102.

Meanwhile, the orientation arithmetic processing section 106 obtains geomagnetic data related to a current position from the geomagnetic acquisition section 107. On the basis of this obtained geomagnetic data, the orientation arithmetic processing section 106 calculates an orientation which the mobile terminal device faces. This orientation denotes an orientation which the top side of the display screen of the mobile terminal device faces under the condition where the mobile terminal device is held by the user so that the display screen thereof is located in parallel with the ground surface. Further, the orientation arithmetic processing section 106 notifies the search result processing section 104 of the calculated orientation as orientation information.

The search result processing section 104 calculates position relations between the current position and destinations on the basis of the longitude and latitude information related to the current position, having been received from the position acquisition section 102, longitude and latitude information related to respective destinations, which are retained in the destination information retaining section 105, and orientation information, having been obtained from the orientation arithmetic processing section 106. Further, the search result processing section 104 displays the calculated position relations on the destination position-relation output section 109. The destination position-relation output section 109 is, for example, a liquid crystal display screen included in a mobile terminal device.

A first embodiment of processing for displaying search results on the destination position-relation output section 109, which is performed by the search result processing section 104, will be described below.

The search result processing section 104 calculates a direct distance from the current position to each of destinations on the basis of longitude and latitude information related to the current position, having been received from the position acquisition section 102, and longitude and latitude information related to each of the destinations, which is retained in the destination information retaining section 105.

Further, the search result processing section 104 displays destinations together with names thereof and distances from the current position thereto in a textual format in ascending order from the destination having the shortest distance from the current position.

A second embodiment of processing for displaying search results on the destination position-relation output section 109, which is performed by the search result processing section 104, will be described below.

Figure 8A:
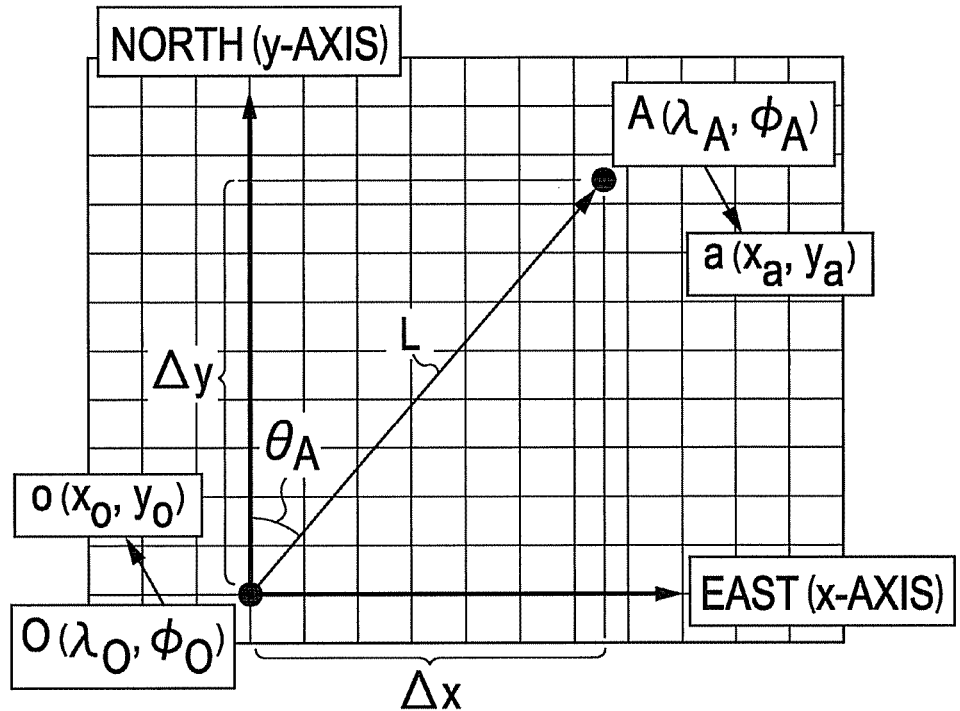
FIGS. 8A and 8B are diagrams illustrating operations of search result processing according to a second embodiment of the present invention.
Figure 8B:
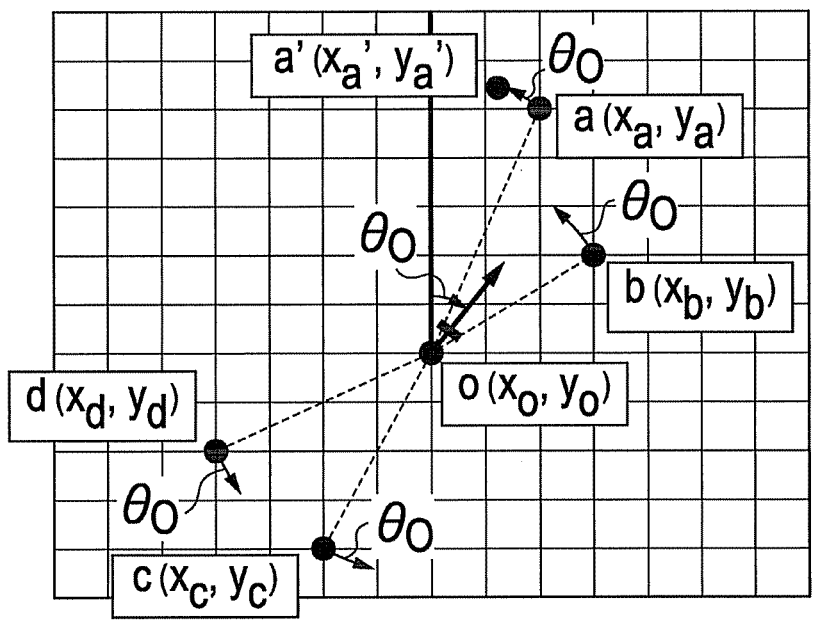
Figure 9:
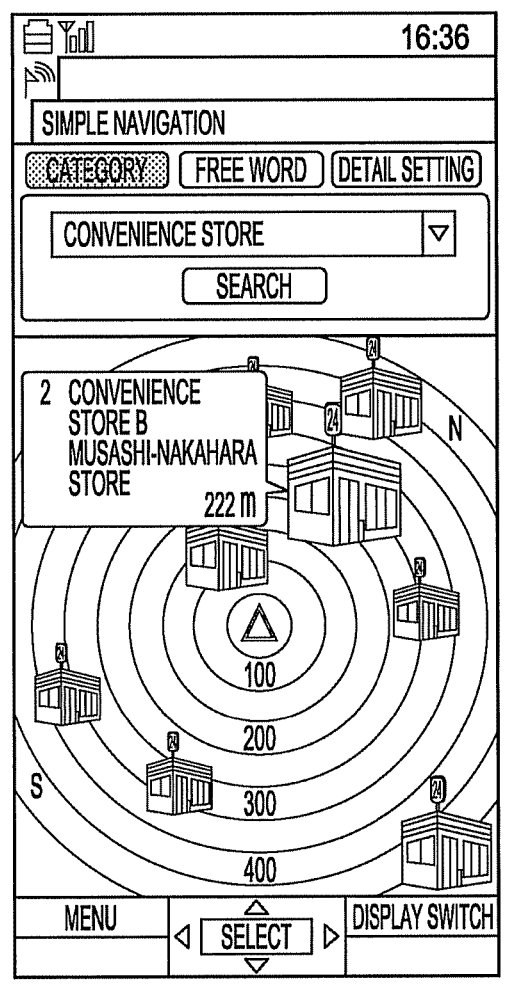
FIG. 9 is a diagram illustrating a search result display screen according to a second embodiment of the present invention.

FIG. 7 is an operation flowchart illustrating operations of a second embodiment of search result display processing performed by the search result processing section 104. FIGS. 8A and 8B are diagrams illustrating operations thereof, and FIG. 9 is a diagram illustrating an example of a display screen therefor. Hereinafter, operations of search result display processing will be described with reference to these diagrams.

Firstly, the search result processing section 104 receives groups of names, search categories, and pieces of longitude and latitude information, which are pieces of position information, from the search processing section 101 as a result of searching for surrounding facilities, and retains the received groups in the destination information retaining section 105 (in step S701 illustrated in FIG. 7).

Next, the search result processing section 104 causes a timer, which is configured to perform control of timings when position information related to a current position is acquired, to start (in step S702 illustrated in FIG. 7).

Next, the search result processing section 104 receives longitude and latitude information from the position acquisition section 102 as position information related to a current position (in step S703 illustrated in FIG. 7).

Next, on the basis of the above-described longitude and latitude information related to the current position, and the above-described longitude and latitude information related to each of destinations, which is retained in the destination information retaining section 105, the search result processing section 104 calculates coordinate values of the current position and each of destinations on a two-dimensional coordinate of a terminal display screen included in the destination position-relation output section 109 (in step S704 illustrated in FIG. 7). This calculation processing is performed in the following method.

Firstly, since a distance between a current position and a destination position is significantly small relative to the radius of the earth, it is assumed that a distance of an arc from the current position to the destination position can be approximated by a direct distance between the current position and the destination position.

Here, pieces of longitude and latitude information related the current position and the destination position, the equatorial radius and the circle ratio are defined as follows:

O ($\lambda_O$, $\phi_O$): Longitude and latitude information related to a current position A ($\lambda_A$, $\phi_A$): Longitude and latitude information related to a destination point EQ_RAD: Equatorial radius [meter]

$\pi$: Circle ratio

Here, an element value denoted by "$\lambda$" is a longitudinal vale, and an element value denoted by "$\phi$" is a latitudinal value.

In order to make it possible to display these pieces of position information on the terminal display screen, as illustrated in FIG. 8A, the current position and the destination point are mapped on a two-dimensional planar coordinate, the positive direction of a y-axis thereon extending in the direction towards an orientation "north", the positive direction of an x-axis thereon extending towards an orientation "east". In order to achieve this mapping, just calculation of a variation $\Delta x$ in the x-axis direction and a variation $\Delta y$ in the y-axis direction is done. The $\Delta x$ and the $\Delta y$ can be calculated in such a way as described below.

Firstly, in the following way, a unit of each of the longitudinal values and the latitudinal values is converted from a representation method using a unit of degree (°) to a representation method using a unit of radian (radian). In addition, this conversion is performed after the representation method using a unit of degree is changed into a decimal representation.

$\lambda_{orad} = \lambda_o \cdot \pi/180$ [radian]

$\phi_{orad} = \phi_o \cdot \pi/180$ [radian]

$\lambda_{Arad} = \lambda_A \cdot \pi/180$ [radian]

$\phi_{Arad} = \phi_A \cdot \pi/180$ [radian] \hfill (1)

Here, assuming that variations in the latitudinal direction and the longitudinal direction between two points of the current position and the destination point are denoted by $\Delta\lambda$ and $\Delta\phi$, respectively, these can be calculated by the following formulae.

$\Delta\lambda = \lambda_{Arad} - \lambda_{orad}$ [radian]

$\Delta\phi = \phi_{Arad} - \phi_{orad}$ [radian] \hfill (2)

Here, by assuming that the earth is a spherical object, a variation $\Delta y$ in the latitudinal direction, that is, in the y-axis direction, can be approximately calculated as the length of a circular arc of the spherical object relative to the variation $\Delta\phi$ in the latitudinal direction. That is, the variation $\Delta y$ can be calculated by using the following formula.

$\Delta y = EQ\_RAD \cdot \Delta\phi$ [meter] \hfill (3)

Meanwhile, in a way similar to that described above, a variation $\Delta x$ in the longitudinal direction, that is, in the x-axis direction, can be approximately calculated as the length of a circular arc of the spherical object relative to the variation $\Delta\lambda$ in the longitudinal direction. Here, the radius of the spherical object varies according to a degree of the latitude, and is proportional to the cosine of a degree of the latitude. Therefore, the variation $\Delta x$ can be calculated by the following formula.

$\Delta x = EQ\_RAD \cdot \Delta\lambda \cdot \cos \phi_{orad}$ [meter] \hfill (4)

Here, coordinate values of the current position and the destination point on the terminal display screen are defined as follows, respectively:

o ($x_o$, $y_o$): A coordinate value of a current position on a terminal display screen coordinate a ($x_a$, $y_a$): A coordinate value of a destination position on a terminal display screen coordinate The x-y coordinate system illustrated in FIG. 8A is a real coordinate system, and thus, is converted into a terminal display screen coordinate system. For this conversion, as a ratio of a specific variation $\Delta\lambda$ in the y-axis direction, corresponding to the farthest destination point, to the longest length of the terminal display screen (for example, the longest length in the long-side direction of the terminal display screen), a reduction scale P is defined. By using this reduction scale, the above-described formulae (3) and (4), and further, the following formulae, the relation between the current position and the destination position on the terminal display screen coordinate system can be calculated.

$x_a = x_o + P \cdot \Delta x$ $y_a = y_o + P \cdot \Delta y$

Now, assuming that the current position is located at the center of the terminal display screen, on the basis of a coordinate value o $(x_o, y_o)$ of the current position on the terminal display screen coordinate, which is determined as a result of the assumption, further, a piece of longitude and latitude information O $(\lambda_O, \phi_O)$, and a piece of longitude and latitude information A $(\lambda_A, \phi_A)$ related to each of the destination points, a coordinate value a $(x_a, y_a)$ of each of the destinations can be calculated by using the above-described formulae (1) to (5). In such a way described above, it is possible to display the current position and destination points on the terminal display screen.

Next, the search result processing section 104 acquires orientation information, which indicates current orientation regarding the terminal device, from the orientation arithmetic processing section 106 (in step S705 illustrated in FIG. 7).

Further, on the terminal display screen, the search result processing section 104 performs a rotation calculation regarding coordinate values so that an orientation regarding the terminal device, which corresponds to the acquired orientation information, is located at the top side of the display screen (in step S706 illustrated in FIG. 7). Causing the orientation regarding the terminal to be located at the top side of the terminal display screen makes it easy for users to intuitively understand directions towards destinations.

Now, as illustrated in FIG. 8B, it is assumed that, under the condition where the terminal device is currently located at o $(x_o, y_o)$, which is a coordinate value on the terminal display screen, and further, an orientation regarding the terminal device, which is indicated by the orientation information, is inclined by an angle $\theta_o$ from an orientation "north", which is a direction forming an angle of 0 degree from the y-axis. Therefore, in order to make the orientation regarding the terminal device to be located at the top side of the terminal display screen, as illustrated in FIG. 8B, coordinate values of individual destination points on the terminal display screen coordinate is just rotated, the coordinate values having been calculated in step S704, by the angle $\theta_o$ in the anticlockwise direction, under the condition where a center of the rotation is located on the coordinate value o $(x_o, y_o)$, which denotes the current position of the terminal on the terminal display screen coordinate. Now, for simplicity, it is assumed that the coordinate value o $(x_o, y_o)$ is an original point, and a coordinate value subsequent to rotation of a coordinate value a $(x_a, y_a)$ of a destination point on the terminal display screen coordinate is represented by a' $(x_a', y_a')$, this value can be calculated by the following formulae:

$$x_a' = x_a \cos\theta_o - y_a \sin\theta_o$$

$$y_a' = x_a \sin\theta_o + y_a \cos\theta_o \quad (6)$$

In addition, the orientation angle $\theta_o$ regarding a terminal device is an absolute rotation angle, but a relative orientation angle $\theta_d$ may be used. In this case, the rotation calculation is represented by the following formulae:

$$x_a' = x_a \cos\theta_d - y_a \sin\theta_d$$

$$y_a' = x_a \sin\theta_d + y_a \cos\theta_d \quad (7)$$

In an example of FIG. 8B, it is represented that, as coordinate values of individual destination points on the terminal display screen coordinate, not only a $(x_a, y_a)$ but also b $(x_b, y_b)$, c $(x_c, y_c)$, d $(x_d, y_d)$ and the like exist, and they are also rotated by the angle $\theta_o$.

Next, the search result processing section 104 displays the resultant rotated coordinate values of individual destination points, which are results of the search, on the terminal display screen coordinate in such a display form illustrated in FIG. 9 (in step S707 illustrated in FIG. 7).

In this display form, in order to allow users to easily understand, for example, distance and position relations among destination points and a current position, concentric circles, each having a label of a distance value from a center point, are indicated, and further, at the relevant positions on the concentric circles, icons for the individual destinations are indicated. As icons for destinations, for example, those corresponding to search categories for respective destinations, which are retained in the destination information retaining section 105 illustrated in FIG. 2, are indicated. That is, in the case where a search category is a "convenience store", an icon for the convenience store is indicated, and in the case where a search category is a "station", an icon for the station is indicated. This display function can be realized by, for example, causing the search result processing section 104 to store therein pieces of icon image data corresponding to respective search categories.

Further, along with displaying of icons, distances from a current position to individual destination points and orientations regarding individual destination points relative to the current position may be indicated. Here, a distance L between a current position and a destination position can be calculated by using the following formula derived from the above-described formulae (3) and (4), relations illustrated in FIG. 8A, and the three squares theorem.

$$L = \text{SQRT}(\Delta x^2 + \Delta y^2)[\text{meter}] \quad (8)$$

In addition, a SQRT (x) is an arithmetic operation for obtaining a square root of a formula x.

Further, in the case where an orientation "north" is located at an angle of 0 degree from the y-axis, as illustrated in FIG. 8A, an orientation angle $\theta_A$ resulting from viewing from the current position O to the destination point A can be calculated by using the following formula.

$$\theta_A = 90° - \arctan(\Delta y/\Delta x)[°] \quad (9)$$

In addition, "arctan (x)" is an arithmetic operation for obtaining an arctangent of a formula x.

By using the formulae (8) and (9), distances and directions to individual destination points can be calculated and displayed on the terminal display screen.

Subsequent to completion of the above-described display operations, the search result processing section 104 waits for a constant time (for example, approximately several milliseconds) (in step S708 illustrated in FIG. 7). Taking into account a case where users move around carrying their mobile terminals, this constant time is provided as an interval period of time until a next calculation of an orientation regarding the mobile terminal starts.

Subsequent to elapse of the waiting time, the search result processing section 104 determines whether an overflow of a timer has occurred, or not (in step S709 illustrated in FIG. 7). Since it is presumed that users move around carrying their mobile terminals, current position information is sequentially updated, and an interval period of time between successive updating thereof may be larger than the above-described interval period of time (the constant time) between successive detections of the orientation regarding the mobile terminal, and is approximately several seconds to several ten seconds. This interval period of time is measured by the timer.

In the case where the overflow of the timer has not yet occurred, the search result processing section 104 returns the process of flow from step S709 to the terminal orientation acquisition processing to be performed in step S705, and there, acquires orientation information regarding the mobile terminal again, and performs redrawing of the terminal display screen on the basis of the new orientation information regarding the mobile terminal.

In the case where the overflow of the timer has already occurred, the search result processing section 104 determines whether an indication of terminating display on the terminal display screen has been notified from the user, or not (in step S710 illustrated in FIG. 7).

In the case where the indication of terminating display on the terminal display screen has not yet been notified from the user, the search result processing section 104 restarts the timer (in step S711 illustrated in FIG. 7). Further, the search result processing section 104 returns the process of flow to the current position information acquisition processing to be performed in step S703, and there, acquires current position information regarding the mobile terminal again, and performs redrawing of the terminal display screen on the basis of the new current position information regarding the mobile terminal.

In the case where the indication of terminating display on the terminal display screen has been already notified from the user, the search result processing section 104 terminates displaying of search results on the terminal display screen.

Next, a third embodiment of search result display processing performed by the search result processing section 104 will be described below.

Figure 10:
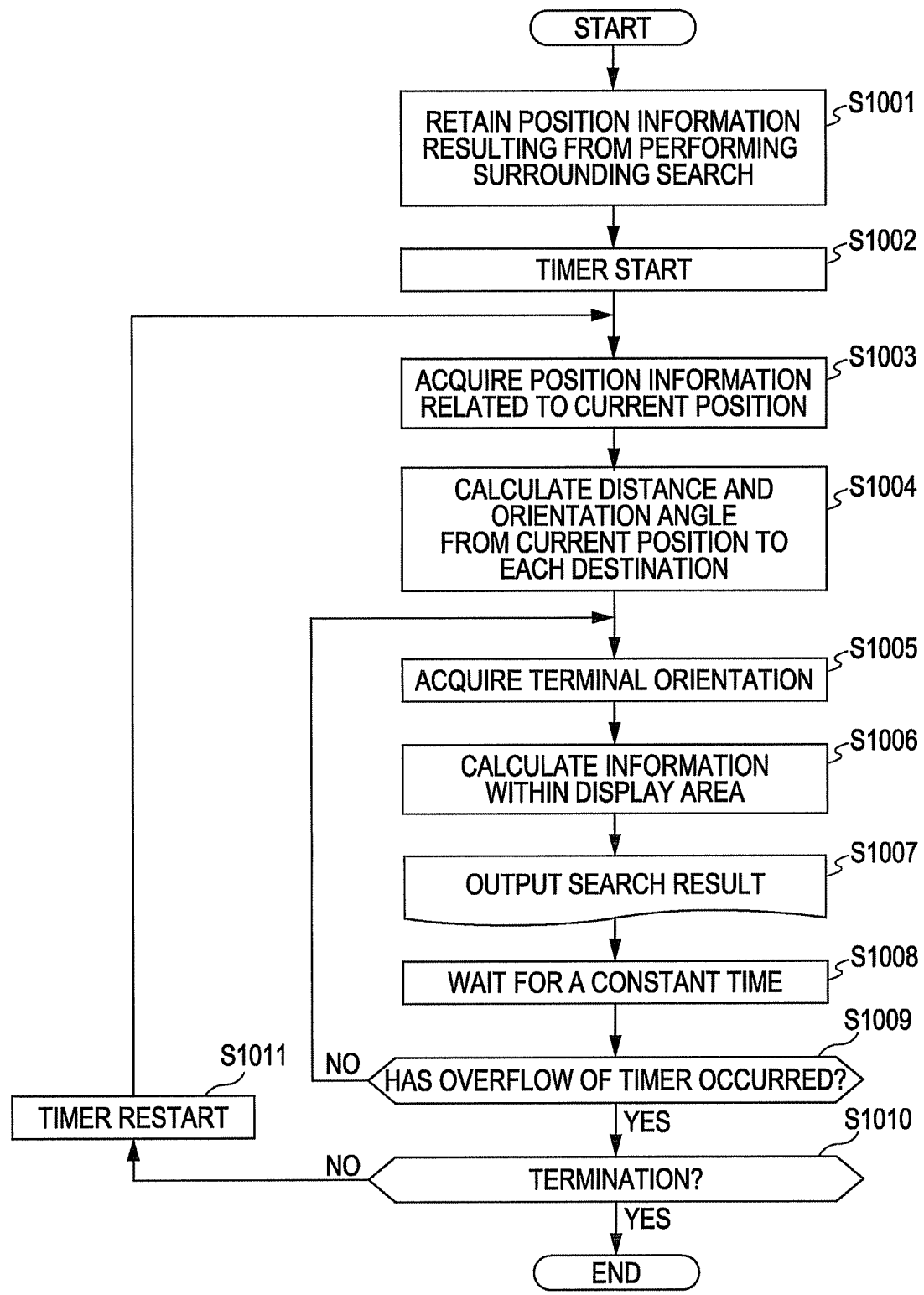
FIG. 10 is a diagram illustrating an operation flowchart of operations of search result processing according to a third embodiment of the present invention.
Figure 11:
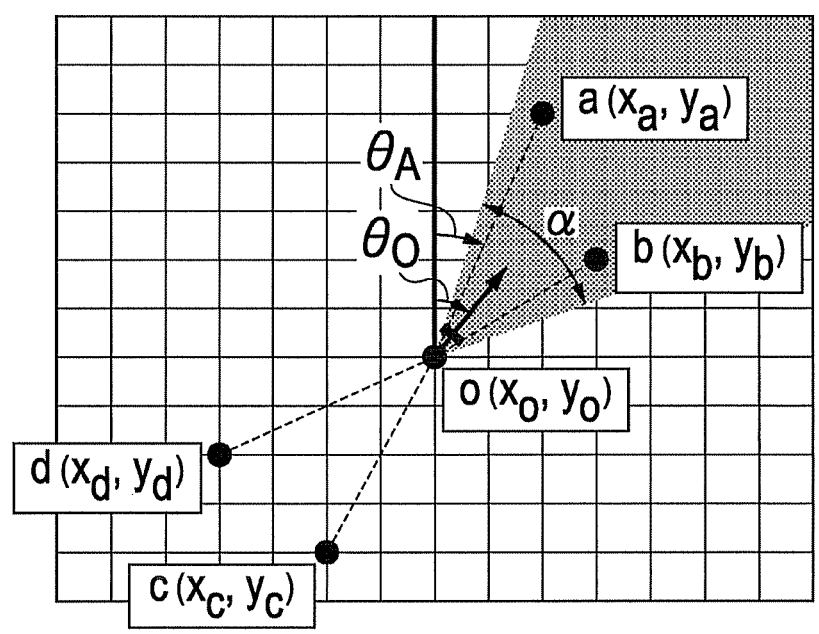
FIG. 11 is a diagram illustrating operations of search result processing according to a third embodiment of the present invention.
Figure 12:
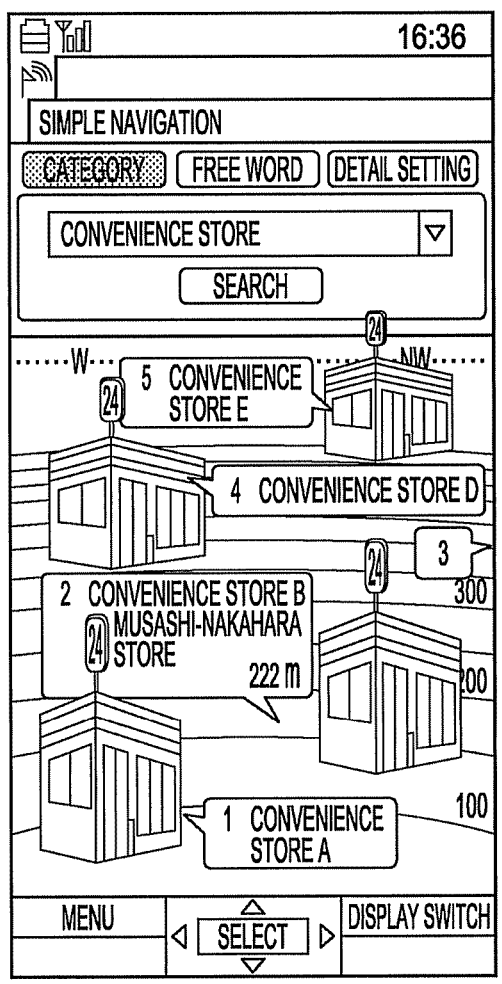
FIG. 12 is a diagram illustrating of operations of a search result display screen according to a third embodiment of the present invention.

FIG. 10 is an operation flowchart illustrating operations of a third embodiment of search result display processing performed by the search result processing section 104. FIG. 11 is a diagram illustrating operations thereof, and FIG. 12 is a diagram illustrating an example of a display screen therefor. Hereinafter, operations of search result display processing will be described with reference to these diagrams.

Firstly, a series of processes to be performed in step S1001 to Step 1003 are the same as or similar to processes performed in Step 701 to Step 703 of the operation flowchart illustrated in FIG. 7, which illustrates operations of the above-described second embodiment of the search result display processing. That is, the search result processing section 104 executes a series of processes including the destination information acquisition process, the timer starting process, and the current position information acquisition process.

Next, on the basis of the above-described longitude and latitude information related to the current position, and the above-described longitude and latitude information related to each of destination points, which is retained in the destination information retaining section 105, the search result processing section 104 calculates distances between the current position and each of the destination points, and individual orientation angles resulting from viewing from the current position to individual destination points (in step S1004 illustrated in FIG. 10). This calculation processing is achieved by using the above-described formulae (8) and (9).

Next, the search result processing section 104 acquires orientation information indicating a current orientation regarding the mobile terminal (in step S1005 illustrated in FIG. 10).

Next, the search result processing section 104 performs a series of processes described below as processes to be performed in step S1006 illustrated in FIG. 10.

That is, firstly, the search result processing section 104 calculates differences between an orientation angle regarding the mobile terminal, which corresponds to the above-described orientation information, and orientation angles regarding individual destination points.

Subsequently, the search result processing section 104 extracts destinations existing within a predetermined display area. Here, for example, a hatching portion illustrated in FIG. 11 is the predetermined display area. This display area is an area, spreading in a fan-like form from an original point, which is located at a current position, and being located between two lines extending in the directions inclined at orientation angles of $\pm\alpha/2$, respectively, relative to a center line extending in the direction towards the orientation angle regarding the mobile terminal. Therefore, the search result processing section 104 extracts destinations for which the above-described difference orientation angles are falling within $\pm\alpha/2$.

Further, on the basis of distances between the current position and individual destination points, and orientation angles resulting from viewing from the current position towards individual destination points, the distances and the orientation angles having been calculated in step S1004, the search result processing section 104 performs mapping of the extracted destinations within the area of the terminal display screen coordinate. In this case, for example, adjustments are performed in processing for a scale reduction, a coordinate rotation and the like so that the fan-like shaped display area can be included within the display screen, further, the current position can be located at the middle of the bottom side of the display screen, and further, the farthest destination point can be located around at the top side of the display screen with perspective.

Further, the search result processing section 104 displays the coordinate values of individual destination points, which were mapped on the terminal display screen coordinate, in such a display form as illustrated in FIG. 9 (in step S1007 illustrated in FIG. 10).

In this display form, in order to allow users to easily understand distance and position relations among destination points and a current position, a three-dimension-like display way, which allows users to feel perspective, is provided. Further, in the same way as or in a manner similar to that illustrated in FIG. 9, concentric circles, each having a label of a distance value from a center point, are indicated, and further, at the relevant positions on the concentric circles, icons for the destinations are indicated.

A subsequent series of processes to be performed in steps S1008 to Step 1011 illustrated in FIG. 10 are the same as or similar to processes performed in steps S708 to S711 of the operation flowchart illustrated in FIG. 7, which illustrates operations of the above-described second embodiment of the search result display processing. That is, subsequent to waiting for a constant time (for example, approximately several milliseconds), in the case where the overflow of a timer has not yet occurred, the search result processing section 104 returns the process of flow from step S1009 to the terminal orientation acquisition processing to be performed in step S1005, and there, acquires orientation information regarding the mobile terminal again, and performs redrawing of the terminal display screen on the basis of the new orientation information regarding the mobile terminal. In the case where the overflow of the timer has already occurred, and further, an indication of terminating display on the terminal display screen has not yet been notified from the user, the search result processing section 104 restarts the timer, and subsequently, returns the process of flow to current position information acquisition processing to be performed in step S1003. Further, the search result processing section 104 acquires current position information regarding the mobile terminal again, and performs redrawing of the terminal display screen on the basis of the current position information regarding the mobile terminal. In the case where the indication of terminating display on the terminal display screen has been already notified from the user, the search result processing section 104 terminates displaying of search results on the terminal display screen.

Figure 6:
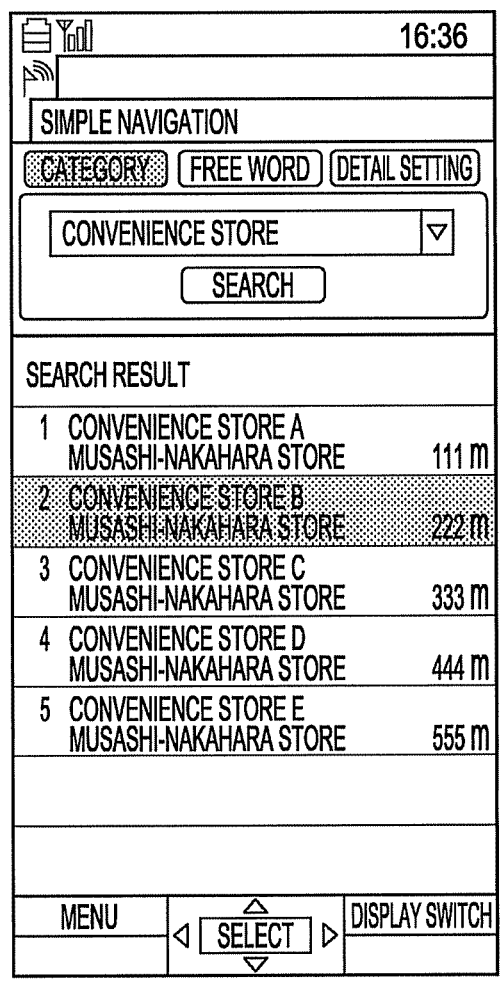
FIG. 6 is a diagram illustrating a search result display screen according to a first embodiment of the present invention.

According to the above-described first to third embodiments of the search result display processing, as illustrated in FIGS. 6, 9 and 12, it is possible to layout display elements on the display screen so that current search words and a next search input display screen are displayed within an upper area of the terminal display screen, the upper area being one-third of the whole area of the display screen, and search results are displayed within a lower area of the terminal display screen, the lower area being two-third of the whole area of the display screen. Owing to such a layout as described above, users can immediately commence a subsequent search on the display screen under the condition where the results of a previous search remain displayed.

Next, destination direction display processing, which is performed by the direction arithmetic processing section 108, illustrated in FIG. 1, immediately after a user selects one destination from among destinations displayed on the display screen, resulting from performing the above-described search result display processing, will be described.

Figure 13:
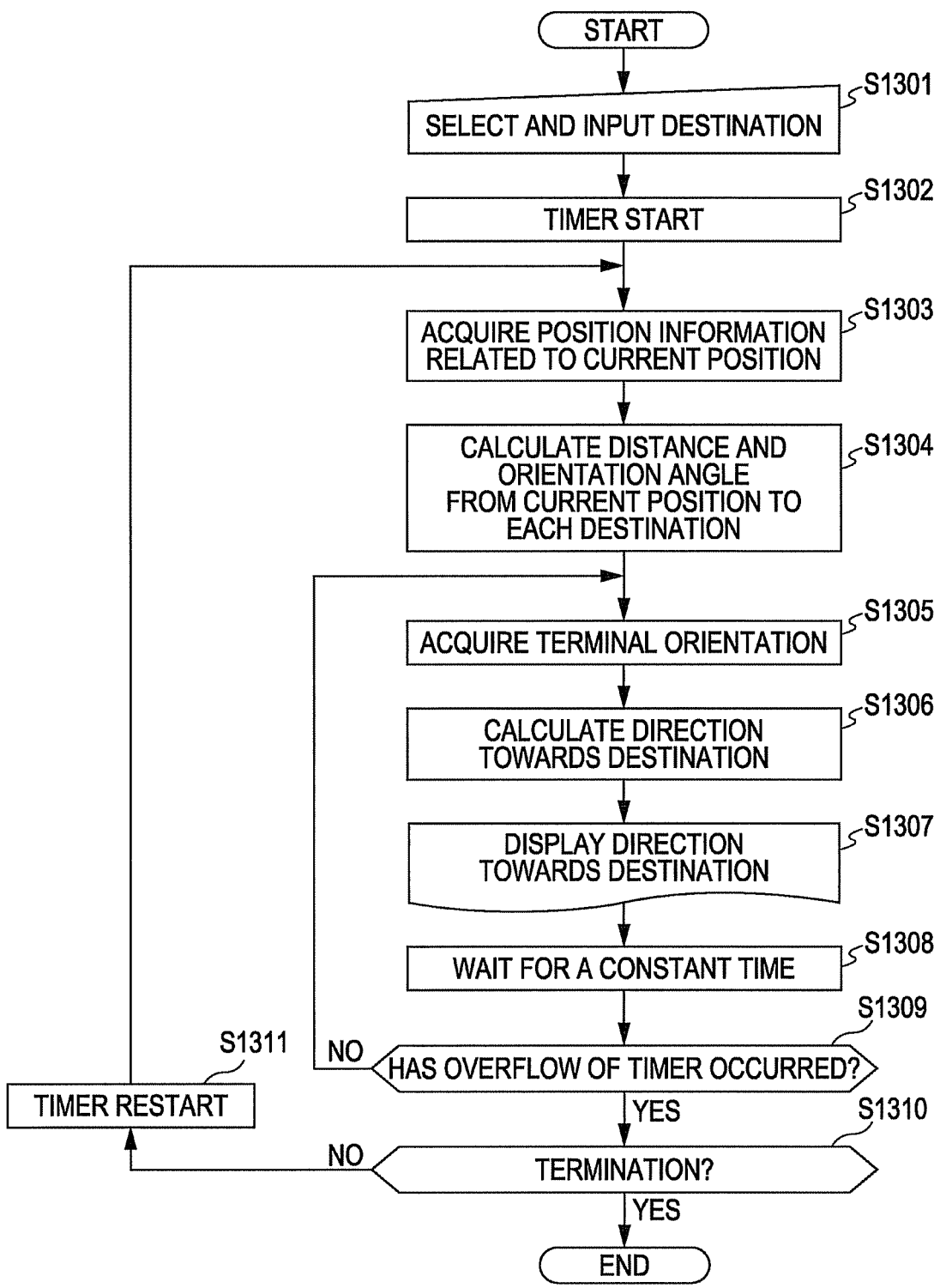
FIG. 13 is an operation flowchart illustrating operations of destination direction display processing according to an embodiment of the present invention.
Figure 14:
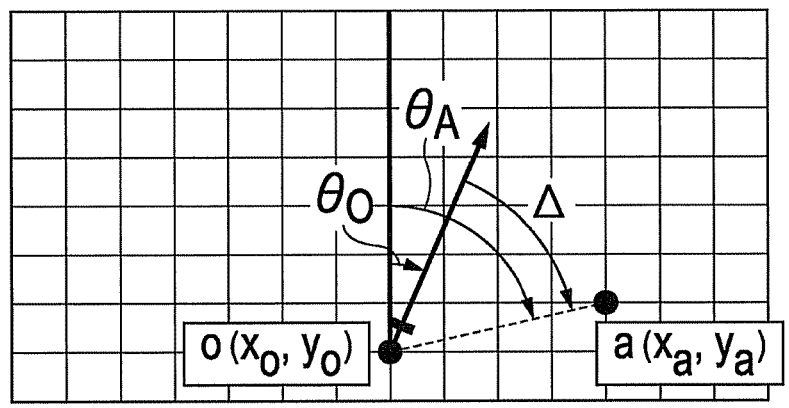
FIG. 14 is a diagram illustrating operations of destination direction display processing according to an embodiment of the present invention.

FIG. 13 is an operation flowchart illustrating operations of destination direction display processing performed by the direction arithmetic processing section 108. Further, FIG. 14 is a diagram illustrating operations thereof. Hereinafter, operations of destination direction display processing will be described with reference to these diagrams.

Firstly, a user selects and inputs a destination by performing a touch operation, or the like, on a textual name (in the case of FIG. 6) or an icon (in the case of FIGS. 9 and 12) corresponding to a desired destination on such search result display screens as illustrated in FIGS. 6, 9 and 12, which are displayed in the embodiments described above (in step S1301 illustrated in FIG. 13).

This information related to the desired destination is notified from the destination search information input section 103 to the direction arithmetic processing section 108. Upon receipt of this information related to the desired destination, the direction arithmetic processing section 108 causes a timer, which is configured to perform control of timings when a current position is acquired, to start (in step S1302 illustrated in FIG. 13). The function of this timer is the same as that of the timer used in the described-above search result processing section 104.

Next, the direction arithmetic processing section 108 receives longitude and latitude information as a current position from the position acquisition section 102 (in step S1303 illustrated in FIG. 13).

Next, on the basis of the longitude and latitude information related to a current position, and the longitude and latitude information related to the selected destination point, which is retained in the destination information retaining section 105, the direction arithmetic processing section calculates a distance between the current position and the selected destination point, and an orientation angle resulting from viewing from the current position towards the selected destination point (in step S1304 illustrated in FIG. 13). This calculation processing is achieved by using the above-described formulae (8) and (9).

Next, the direction arithmetic processing section 108 acquires orientation information indicating a current orientation regarding the mobile terminal from the orientation arithmetic processing section 106 (in step S1305 illustrated in FIG. 13).

Next, the direction arithmetic processing section 108 calculates a difference between a terminal orientation angle corresponding to the acquired orientation information and the orientation angle regarding the selected destination, and thereby, calculates a direction to the selected destination (in step S1306 illustrated in FIG. 13). Here, as illustrated in FIG. 14, it is assumed that a coordinate value of the current position on the terminal display screen coordinate is denoted by o ($x_o$, $y_o$), and a coordinate value of the selected destination position on the terminal display screen coordinate is denoted by a ($x_a$, $y_a$). Further, assuming that the terminal orientation angle is denoted by $\theta_o$, and an orientation angle regarding the selected destination is denoted by $\theta_A$, a difference $\Delta$ between these angles can be calculated from the following formulae:

$$\Delta = \theta_A - \theta_o [°] (\theta_A - \theta_o \geq 0)$$

$$\Delta = 360° - (\theta_A - \theta_o)[°] (\theta_A - \theta_o < 0) \quad (10)$$

In addition, the following condition is to be satisfied.

$$0 \leq \Delta \leq 360$$

Further, on the terminal display screen, in order to cause the orientation regarding the terminal device to be located at the top side of the display screen, the direction arithmetic processing section 108 displays a direction towards the selected destination by rotating an arrow by $\Delta$ degree from the orientation regarding the terminal device. By performing such an operation as described above, the direction arithmetic processing section 108 displays a direction towards the selected destination (in step S1307 illustrated in FIG. 13). The arrow can be displayed in such various display ways as illustrated in FIGS. 17 to 20, which will be described below.

Subsequently, the direction arithmetic processing section 108 waits for a constant time (for example, approximately several milliseconds) (in step S1308 illustrated in FIG. 13).

Subsequent to elapse of the waiting time, the direction arithmetic processing section 108 determines whether an overflow of a timer has occurred, or not (in step S1309 illustrated in FIG. 13).

In the case where the overflow of the timer has not yet occurred, the direction arithmetic processing section 108 returns the process of flow from step S1309 to the terminal orientation acquisition processing to be performed in step S1305, and there, acquires orientation information regarding the mobile terminal again, and performs redrawing of the terminal display screen on the basis of the new orientation information regarding the mobile terminal.

In the case where the overflow of the timer has already occurred, the direction arithmetic processing section 108 determines whether an indication of terminating display on the terminal display screen has been notified from the user, or not (in step S1310 illustrated in FIG. 13).

In the case where the indication of terminating display on the terminal display screen has not yet been notified from the user, the direction arithmetic processing section 108 restarts the timer (in step S1311 illustrated in FIG. 13). Further, the direction arithmetic processing section 108 returns the process of flow to the current position information acquisition processing to be performed in step S1303, and there, acquires current position information regarding the mobile terminal again, and performs redrawing of the terminal display screen on the basis of the new current position information regarding the mobile terminal.

In the case where the indication of terminating display on the terminal display screen has been already notified from the user, the direction arithmetic processing section 108 terminates displaying of a direction towards the destination on the terminal display screen. Subsequently, the display screen returns to, for example, a previous search result display screen, and control is handed over back to the search result processing section 104.

Figure 15:
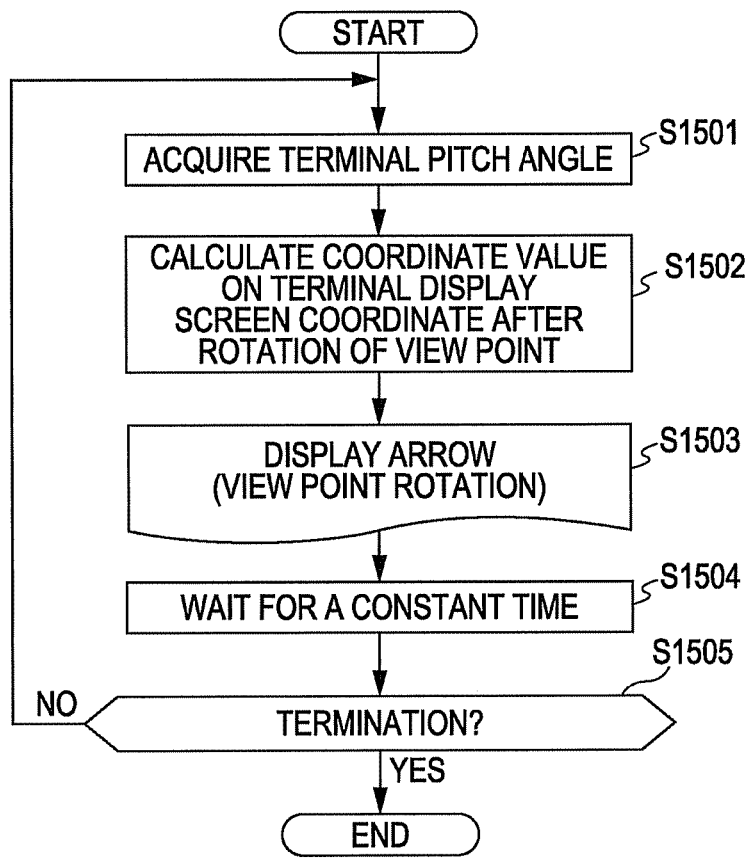
FIG. 15 is an operation flowchart illustrating operations of view point movement processing performed in destination direction display processing, according to an embodiment of the present invention.
Figure 16A:
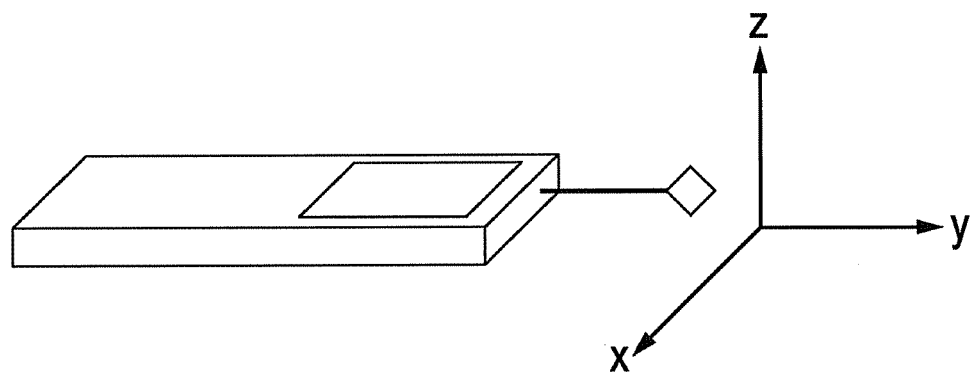
FIGS. 16A and 16B are diagrams illustrating operations of view point movement processing performed in destination direction display processing, according to an embodiment of the present invention.
Figure 16B:
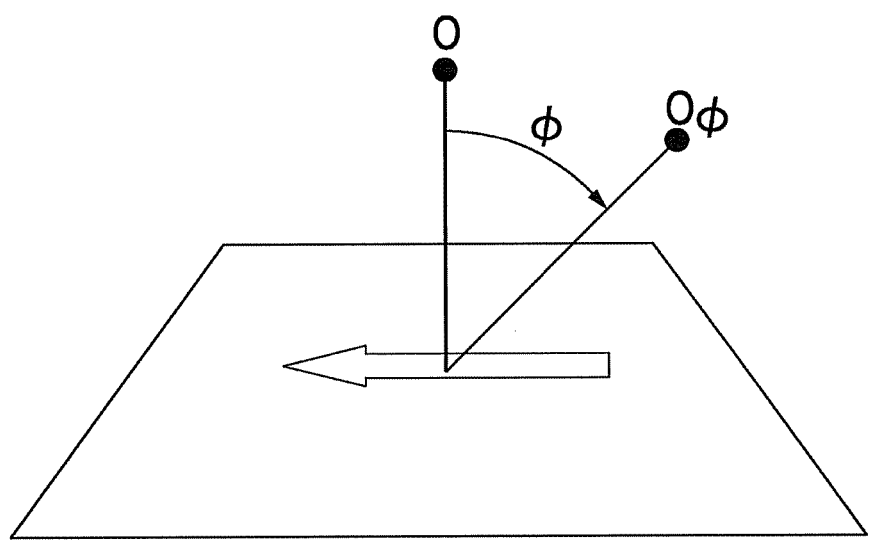

FIG. 15 is an operation flowchart illustrating operations of view point movement processing in the destination direction display processing performed by the direction arithmetic processing section 108. Further, FIGS. 16A and 16B are diagrams illustrating operations thereof. Hereinafter, operations of the view point movement processing will be described with reference to these diagrams.

Figure 17:
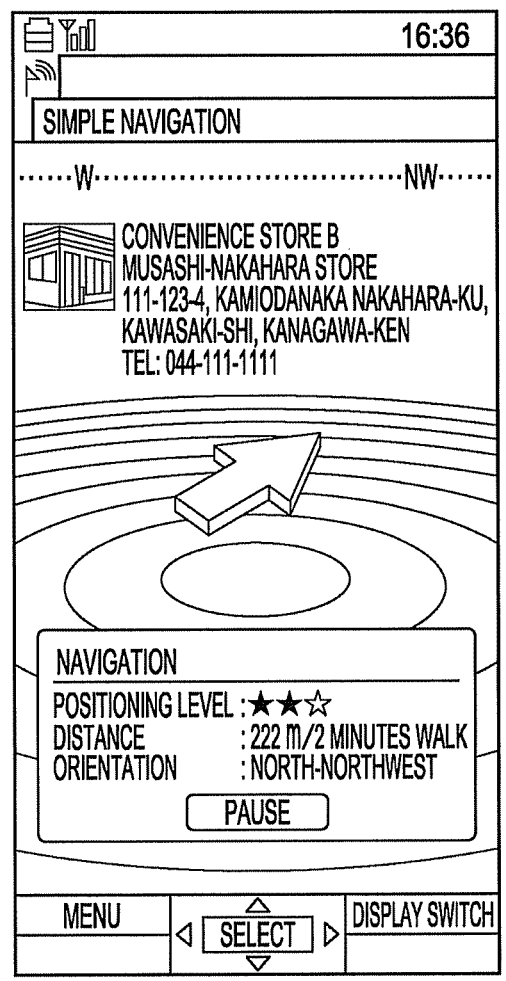
FIG. 17 is a diagram illustrating an example of a destination direction display screen according to an embodiment of the present invention.
Figure 18:
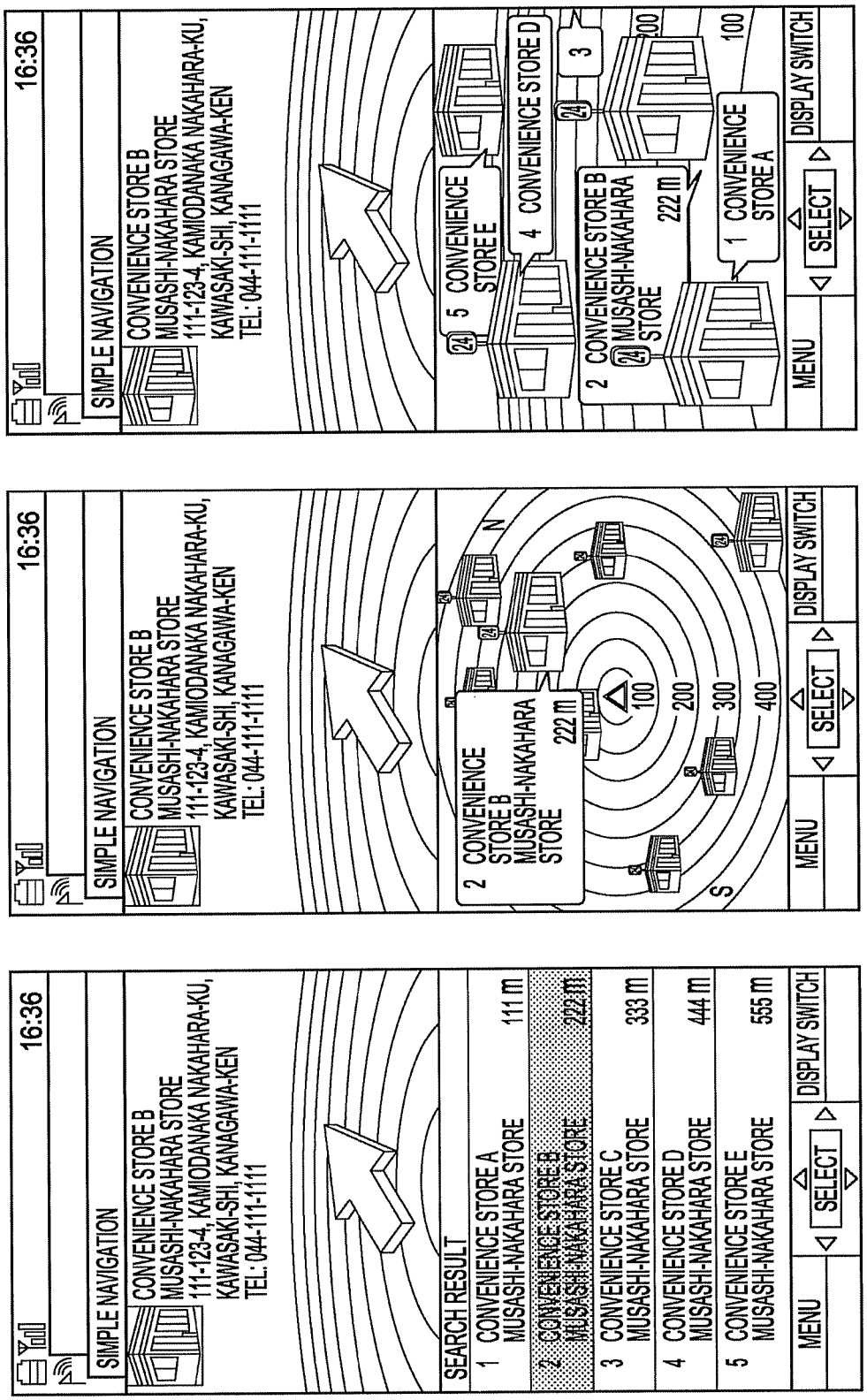
FIG. 18 is a diagram illustrating an example-1 of a display screen which is segmented into a destination direction display screen and a search result display screen, according to an embodiment of the present invention.

In this view point movement processing, while an arrow indicating a direction towards a destination point selected in the above-described destination direction display processing is displayed, the direction arithmetic processing section 108 calculates inclination of the mobile terminal device on the basis of gravity vector from an acceleration sensor section 110 illustrated in FIG. 1. Further, the direction arithmetic processing section 108 performs processing for rotation of a view point of an arrow display screen coordinate on the basis of the calculated inclination of the mobile terminal device. As a result of this processing, for example, as illustrated in FIG. 17, in the case where a planar surface of a display device included in the mobile terminal device is inclined at an angle ϕ relative to the ground surface, by causing the view point of the arrow display screen coordinate to be inclined at the angle ϕ relative to the ground surface, a three-dimensional visual effect resulting from causing the arrow display screen to be constantly horizontal relative to the ground surface on the destination direction display screen included in the display device included in the mobile terminal device can be achieved. This operation enables the arrow to constantly indicate a direction towards a destination point correctly, regardless of the way of carrying the mobile terminal device. Further, on the destination direction display screen, it is possible to add a visual effect, in which a floating arrow moves around in a swinging condition in accordance with inclination of the mobile terminal device.

Firstly, the direction arithmetic processing section 108 acquires a terminal pitch angle of the mobile terminal device on the basis of the gravity vector from the acceleration sensor section 110 (in step S1501 illustrated in FIG. 15). Here, when a terminal display screen coordinate system is defined as one illustrated in FIG. 16A, a terminal pitch angle ϕ is an angle at which the planer surface (i.e., the display screen) of the mobile terminal device is inclined relative to a y-axis, further in the case where the terminal pitch angle ϕ is 0 degree, the y-axis is located in parallel with the planer surface, and in the case where the terminal pitch angle ϕ is 90 degree, the y-axis is located in the direction extending vertically upward from the planer surface.

Next, the direction arithmetic processing section 108 performs view point switching regarding a terminal display coordinate value at which an arrow is drawn. As illustrated in FIG. 16A, in the case where the terminal pitch angle is 0 degree, a point O is regarded as a view point, and in the case where the terminal pitch angle is ϕ degree, the view point is rotated at the angle of ϕ.

Further, the direction arithmetic processing section 108 displays an arrow, for which the view point has been rotated, on the display screen (in step S1503 illustrated in FIG. 15).

Subsequently, the direction arithmetic processing section 108 waits for a constant time (for example, approximately several milliseconds) (in step S1504 illustrated in FIG. 15).

Subsequent to elapse of the waiting time, the direction arithmetic processing section 108 determines whether an indication of terminating the display on the display screen has received from the user, or not (in step S1505 illustrated in FIG. 15).

In the case where the indication of terminating the display has not yet been received from the user, the direction arithmetic processing section 108 returns the flow of process from step S1505 to the terminal pitch angle acquisition processing performed in step S1501, where a terminal pitch angle is acquired again, and an arrow is redrawn on the basis of the new terminal pitch angle.

In the case where the indication of terminating the display has already been received from the user, the direction arithmetic processing section 108 terminates the drawing processing performed on the basis of the terminal pitch angle.

As described above, the technology disclosed in the present invention enables users to display the search result display screen as a first display screen, which is displayed in each of the embodiments illustrated in FIGS. 6, 9 and 12. By providing such a display screen, search results are not merely displayed, but can be displayed in the form of a list of pieces of destination information, each including information related to a direction and a distance from a current position to the relevant destination. Further, once a user selects a destination targeted for search from among the listed destinations, subsequently, on the destination direction display screen illustrated in FIG. 17, which is a second display screen, it is possible for the user to effectively display conditions regarding with what direction relation and how the terminal device of the user is moving towards the destination. It is a characteristic of this disclosed technology that, in such a way as described above, relations between a current position and individual destinations is not merely displayed in a format of a map, but can be displayed from a viewpoint of directions and distances from a current position thereto. Furthermore, on the basis of this viewpoint, it is possible for users to transit a display condition at will from a display screen in a listing form, which is the first display screen, to a display screen in a detailed form using an arrow, which is the second display screen.

Each of FIGS. A, B and C is a diagram illustrating an example in which a terminal display screen is segmented into two kinds of display screens, one being a destination direction display screen illustrated in FIG. 17, the other one being a search result display screen such as one illustrated in FIG. 6, 9 or 12. Providing such a layout of the display screen enables realization of a destination search function which is provided with operational enjoyment and a new perspective of directions and distances from a current position to individual destinations.

Figure 19:
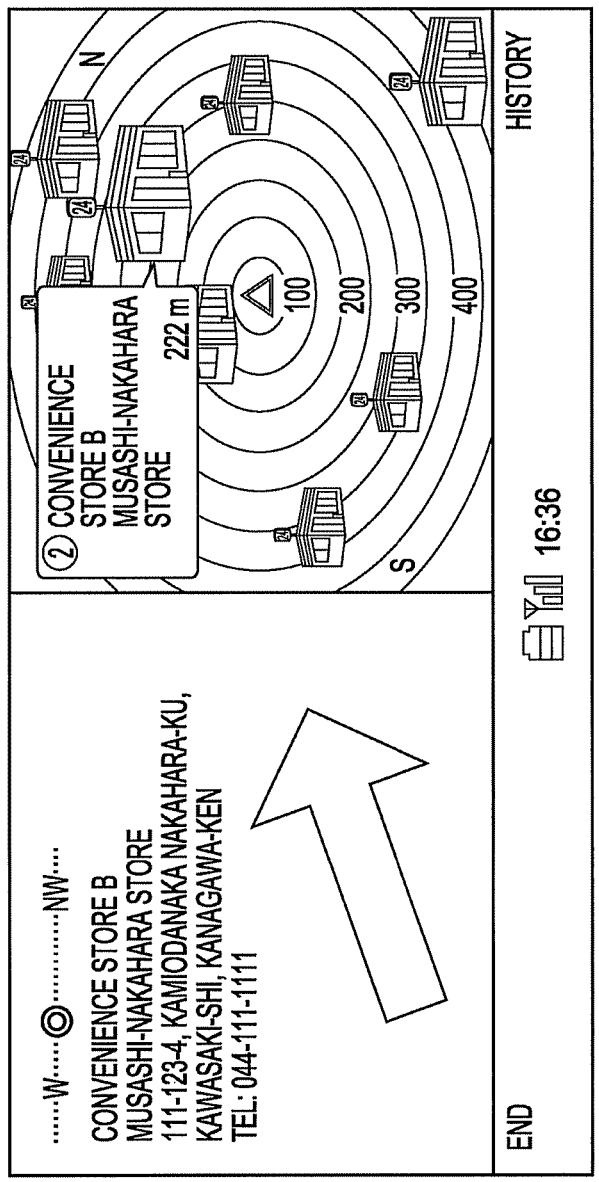
FIG. 19 is a diagram illustrating an example-2 of a display screen which is segmented into a destination direction display screen and a search result display screen, according to an embodiment of the present invention.

FIG. 19 is a diagram illustrating an example of a display screen which is segmented into two kinds of display screens in a longitudinal direction, one being a destination direction display screen, the other one being a search result display screen. Providing such a display form in accordance with user's utilization way leads to an enhancement of convenience.

Figure 20A:
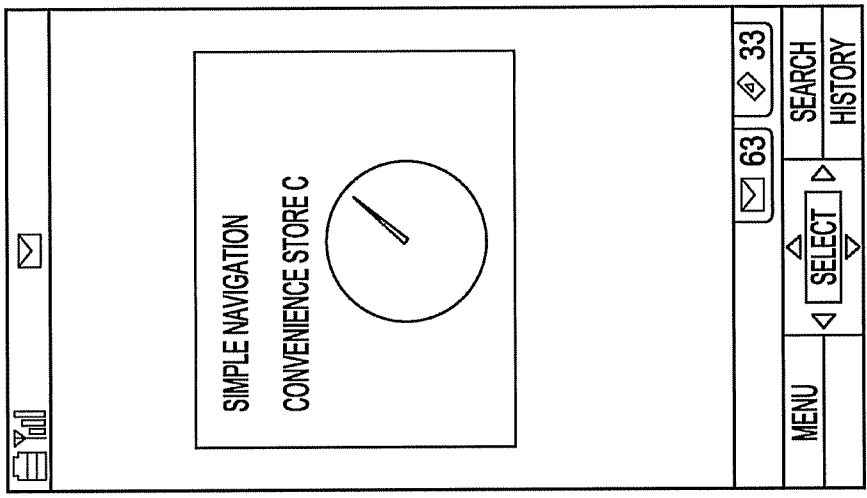
FIG. 20A to 20C are diagrams respectively illustrating an example of a display screen in which a destination search input display, a search result display and a destination direction display are realized by means of widget drawing, according to an embodiment of the present invention.
Figure 20B:
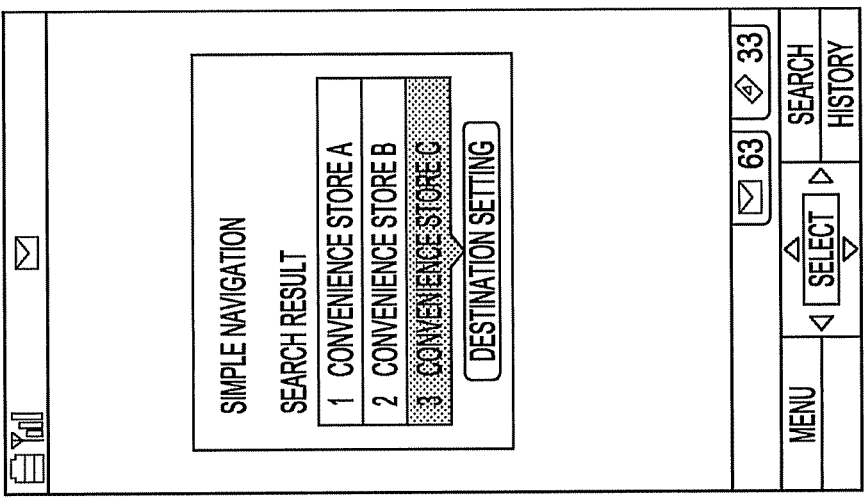
Figure 20C:
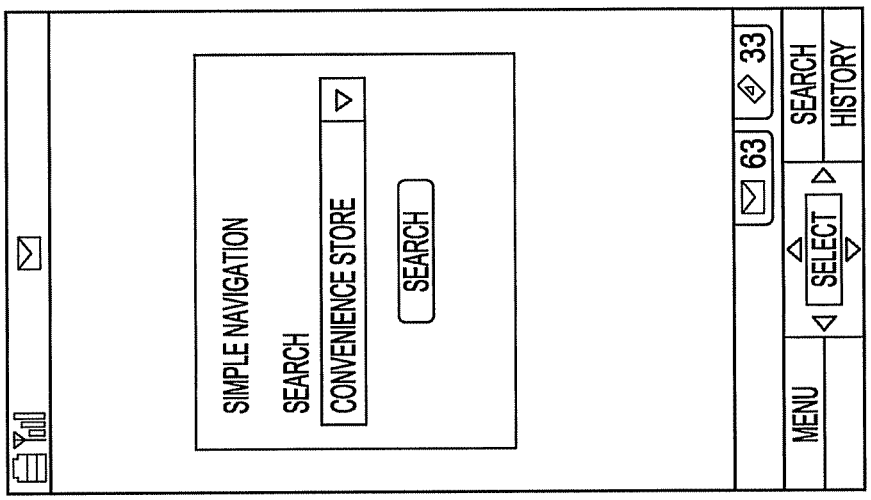

FIGS. 20A, 20B and 20C are diagrams illustrating examples of display screens in each of which a destination search input display, a search result display, and a destination direction display are realized by means of widget drawing.

Here, the "widget" is a generic term of applications each including simple graphical display functions used for executing specific functions on a terminal display screen or a desktop of a personal computer.

In this embodiment, once a widget application for a destination search is invoked on a standby screen, or the like, of a mobile terminal, a user can search destinations at any time by using, for example, a display screen illustrated in FIG. 20A. As a result of this operation, a search result display screen illustrated in FIG. 20B is displayed by using the widget display function. When a user performs a touch operation, or the like, on one of the searched destinations, displaying of a direction towards such a destination as illustrated in FIG. 20C (i.e., "convenience store C" illustrated in FIG. 20C) is performed. While a user moves around, the direction indicated by this direction display is effectively varied in accordance with the movement.

In this example, it is also possible for a user to select a specific destination from among destinations displayed in a listing form, which is a first display screen, and further, transit a display condition from the display screen in a listing form to a second display screen which enables display of a direction or the like towards the selected destination effectively.

Figure 21:
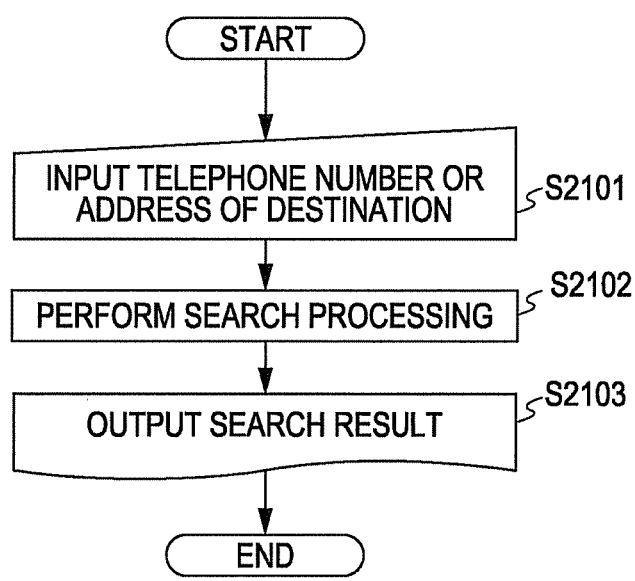
FIG. 21 is an operation flowchart illustrating operations of telephone number or address facility search processing according to an embodiment of the present invention.

FIG. 21 is an operation flowchart illustrating operations of processing performed by an apparatus for providing a position information service, in the case where, for example, on a menu display screen illustrated in FIG. 3, a user selects an item denoted by "telephone number/address facility search", by performing a touch operation on it, or the like, from among items included in a list of the local database.

In this case, a search display screen just like an example of a surrounding facilities search display screen, illustrated in FIG. 5A or 5B, is displayed. An input item to be specified is a telephone number or an address. By using this display screen, a user inputs and specifies a telephone number or an address as a search word (in step S2101 illustrated in FIG. 21).

Responding to this operation, the search control section 201 illustrated in FIG. 2 causes the destination search information input section 103 to enter the input search word. Further, the search control section 201 requests the local database search executing section 202 to perform search processing on the basis of the search word, i.e., the input telephone number or address (in step S2102 illustrated in FIG. 21).

Here, in the local database storing section 203, a database related to positions of facilities corresponding to telephone numbers or addresses is stored. In this local database storing section 203, for example, records corresponding to individual facilities, each including pieces of information, such as a name, a telephone number, an address, a search category, and a piece of longitude and latitude information, are stored.

The local database search executing section 202 searches the local database storing section 203 for records on the basis of the notified search word. Further, the local database search executing section 202 notifies groups of names, search categories, telephone numbers, addresses and pieces of longitude and latitude information, which are created from the searched records, to the search control section 201.

The database stored in the local database storing section 203 can be acquired in advance by, for example, causing the local database acquisition control section 204 to download data from a server center via the server communication control section 205.

Further, the database stored in the local database storing section 203 can be acquired in advance by causing the local database acquisition control section 204 to read out data from external devices, such as an IC card reader/writer, via the contactless communication control section 206 and store the read-out data into the local database.

Alternatively, the database stored in the local database storing section 203 can be acquired in advance by causing the local database acquisition control section 204 to read out data from a memory card, or the like, via the portable record medium driving section 207 and store the read-out data into the local database.

Subsequent to completion of search processes performed by the search processing section 101 illustrated in FIG. 1 in such a way as described above (in step S2102 illustrated in FIG. 21), the search result processing section 104 displays the search results on the destination position-relation output section 109 (in step S2103 illustrated in FIG. 21).

That is, the search result processing section 104 receives the groups of names, telephone numbers, addresses, search categories and pieces of longitude and latitude information from the search processing section 101, and retains the received groups in the destination information retaining section 105.

Further, the search result processing section 104 receives a piece of longitude and latitude information related to a current position from the position acquisition section 102.

Meanwhile, the orientation arithmetic processing section 106 acquires geomagnetic data related to the current position from the magnetism acquisition section 107, which can be realized by using a geomagnetic sensor. On the basis of the acquired geomagnetic data, the orientation arithmetic processing section 106 calculates an orientation which the mobile terminal device is facing. Further, the orientation arithmetic processing section 106 notifies the search result processing section 104 of the calculated piece of orientation information.

The search result processing section 104 performs arithmetic processing regarding position relations between the current position and individual destinations, on the basis of the piece of longitude and latitude information related to the current position, having been received from the position acquisition section 102, further, the pieces of longitude and latitude information related to individual destinations, which are retained in the destination information retaining section 105, and the piece of orientation information, having been received from the orientation arithmetic processing section 106. Further, the search result processing section 104 displays the position relations resulting from the arithmetic processing on the destination position-relation output section 109. The destination position-relation output section 109 is, for example, a liquid crystal display screen included in the mobile terminal device.

Processes to be performed in this display processing are the same as or similar to those performed in the above-described surrounding facilities search processing. That is, the search result processing section 104 performs the search result display processing, which was described above with reference to FIGS. 6 to 12, and as a result, search results are displayed on the search result display screen. Further, the direction arithmetic processing section 108 performs the destination direction display processing, which was described above with reference to FIGS. 13 to 20, and as a result, one of directions from the current position to individual destinations is indicated by using an arrow.

As a result of the facility search processing using telephone numbers or addresses, the above-described search processing enables realization of the following effective display method which allows switching of display screens regarding the destination facilities, the display method being different from existing display methods each using just a map-based form. That is, the above-described search processing enables realization of a display screen in a listing form as a first display screen, such as the display screens according to the embodiments, illustrated in FIGS. 6, 9 and 12, on which pieces of information related to directions and/or distances from a current position to individual destinations are displayed. Further, subsequent to a user's selection of one of the destinations for search, the above-described search processing enables realization of a destination direction display screen as a second display screen, such as the display screen according to the embodiment, illustrated in FIG. 17. In this case also, the above-described processing enables the user to intuitively understand position relations regarding destination facilities from a viewpoint of directions and distances from a current position to individual destinations.

Figure 22:
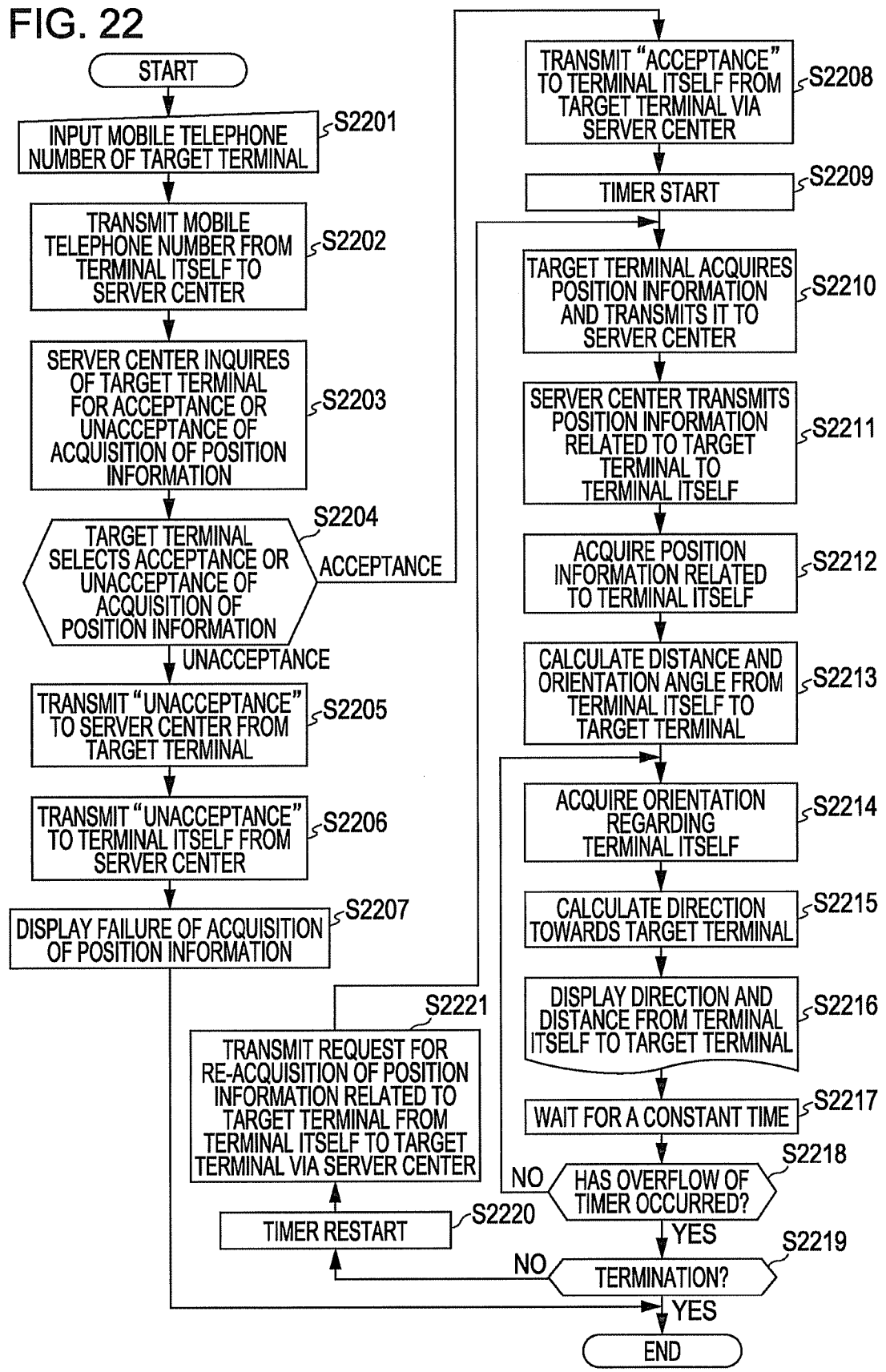
FIG. 22 is an operation flowchart illustrating operations of mobile telephone position search processing according to an embodiment of the present invention.

FIG. 22 is an operation flowchart illustrating operations of mobile terminal position search processing, which is jointly performed by an apparatus for providing a position information service according to this embodiment, a server center and a target mobile terminal in the case where a user selects an item denoted by "mobile-phone position search", by performing a touch operation, or the like, from among items included in the list of remote search items, displayed on the menu display screen illustrated in FIG. 3.

In this case, a search display screen just like an example of a surrounding facilities search display screen, illustrated in FIG. 5A or 5B, is displayed. An input item to be specified is a mobile telephone number. By using this display screen, a user inputs and specifies a mobile telephone number of a target mobile terminal as a search word (in step S2201 illustrated in FIG. 21).

Responding to this operation, the search control section 201 illustrated in FIG. 2 causes the destination search information input section 103 to enter the input search word. Further, the search control section 201 requests the server search executing section 208 to perform search processing on the basis of the search word, i.e., the mobile telephone number of the target mobile terminal. The server search executing section 208 transmits the mobile telephone number of the target mobile terminal to a server center via a wireless communication network and requests the server center to perform the search (in step S2202 illustrated in FIG. 22). As described above, by performing, for example, a WWW-based access using the HTTP method, the server search executing section 208 establishes a connection between a WWW-based server installed at the server center and an executing section for performing position search processing regarding mobile terminals (the executing section being omitted from illustration).

On the basis of the mobile telephone number of the targeted mobile terminal, having been notified by the server search executing section 208 included in the mobile terminal itself, the server inquires of the target mobile terminal whether a request for acquisition of position information can be accepted, or not (in step S2203 illustrated in FIG. 22).

Upon receipt of the inquiry from the server center, the target mobile terminal selects acceptance or unacceptance of the request for acquisition of position information on the basis of setting therefor performed by a user in advance, or a selection therefor manually performed by a user (in step S2204 illustrated in FIG. 22).

In the case where the target mobile terminal selects unacceptance of the request for acquisition of position information, the target mobile terminal transmits a message indicating "unacceptance" of the request for acquisition of position information to the server center (in step S2205 illustrated in FIG. 22). As a result, the server center notifies a message indicating "unacceptance" of the request for acquisition of position information to the server search executing section 208 included in the mobile terminal itself (in step S2206 illustrated in FIG. 22).

The server search executing section 208 notifies the search control section 201 of the failure of acquisition of position information. Upon receipt of this notification, the search control section 201 notifies a display screen included in the mobile terminal of the failure of acquisition of position information (in step S2207 illustrated in FIG. 22), and then, terminates the mobile terminal position search processing.

Meanwhile, in the case where the target mobile terminal selects acceptance of the request for acquisition of position information, the target mobile terminal transmits a message indicating "acceptance" of the request for acquisition of position information to the server center, and further, the server center transmits the message indicating "acceptance" of the request for acquisition of position information to the mobile terminal itself (in step S2208 illustrated in FIG. 22).

The server search executing section 208 notifies the search control section 201 of the acceptance of the request for acquisition of position information from the target mobile terminal. Further, this notification is transmitted to the direction arithmetic processing section 108 from the search control section 201. As a result, the direction arithmetic processing section 108 causes a timer, which is configured to perform control of timings when pieces of position information related to the target mobile terminals and the mobile terminal itself are acquired, to start (in step S2209 illustrated in FIG. 22).

Subsequent to completion of the processing performed in step S2208, the targeted mobile telephone terminal acquires a piece of position information (a piece of longitude and latitude information) from a GPS receiver or the like included in the target mobile terminal itself, and transmits the acquired piece of position information to the server center (in step S2210 illustrated in FIG. 22).

The server center transmits the position information related to the target mobile terminal to the mobile terminal itself. Upon receipt of the position information, the server search executing section 208 of the mobile terminal itself transfers it to the search result processing section 104. The search result processing section 104 retains the piece of position information, i.e., the piece of longitude and latitude information, related to the target mobile terminal, in the destination information retaining section 105 (these processes being performed in step S2211 illustrated in FIG. 22).

Next, control having been performed by the search result processing section 104 is handed over to that of the direction arithmetic processing section 108. The direction arithmetic processing section 108 receives a piece of longitude and latitude information related to a current position of the mobile terminal itself from the position acquisition section 102 (in step S2212 illustrated in FIG. 22).

Next, on the basis of the piece of longitude and latitude information related to the current position and the piece of longitude and latitude information related to the target mobile terminal position, which is retained in the destination information retaining section 105, the direction arithmetic processing section 108 calculates a distance between the mobile terminal itself and the target mobile terminal, and an orientation angle viewed from the mobile terminal itself towards the target mobile terminal (in step S2213 illustrated in FIG. 22). This calculation processing can be realized by performing the above-described processing using the formulae (8) and (9).

Next, the orientation arithmetic processing section 108 acquires a piece of orientation information indicating a current orientation regarding the terminal itself from the orientation arithmetic processing section 106 (in step S2214 illustrated in FIG. 22).

Next, the orientation arithmetic processing section 108 calculates a direction towards the target mobile terminal by calculating a difference Δ between an orientation angle regarding the mobile terminal itself, corresponding to the acquired piece of orientation information, and the calculated orientation angle regarding the target mobile terminal (in step S2215 illustrated in FIG. 22). This calculation processing can be realized by performing the above-described processing using the formula (10).

Further, on the display screen coordinate of the mobile terminal itself, the orientation arithmetic processing section 108 displays a direction and a distance from the mobile terminal itself to the target mobile terminal by causing the orientation regarding the mobile terminal itself to be located in the direction towards the top side of the terminal display screen, and further, displaying an arrow so that the arrow points a direction which is rotated by an angle of Δ degree from the orientation regarding the mobile terminal itself (in step S2216 illustrated in FIG. 22). The arrow can be displayed, for example, in such the display form illustrated in FIG. 17.

Subsequently, the direction arithmetic processing section 108 waits for a constant time (for example, approximately several milliseconds) (in step S2217 illustrated in FIG. 22).

Subsequent to elapse of the waiting time, the direction arithmetic processing section 108 determines whether an overflow of a timer has occurred, or not (in step S2218 illustrated in FIG. 22).

In the case where the overflow of the timer has not yet occurred, the direction arithmetic processing section 108 returns the process of flow from step S2218 to the orientation acquisition processing regarding the mobile terminal itself, which is performed in step S2214, and there, acquires an orientation regarding the mobile terminal itself again, and performs redrawing of the terminal display screen on the basis of the new orientation regarding the mobile terminal itself.

In the case where the overflow of the timer has already occurred, the direction arithmetic processing section 108 determines whether an indication of terminating a display on the terminal display screen has been notified from the user, or not (in step S2219 illustrated in FIG. 22).

In the case where the indication of terminating a display on the terminal display screen has not yet been notified from the user, the direction arithmetic processing section 108 causes the timer to restart (in step S2220 illustrated in FIG. 22). Further, the direction arithmetic processing section 108 transmits a request for re-acquisition of position information related to the target mobile terminal to the server center. This request is further transmitted from the server center to the target mobile terminal (in step S2221 illustrated in FIG. 22). As a result of this operation, the process of flow returns to the processing performed in step S2210, and in the target mobile terminal, a piece of position information is acquired again. The acquired piece of position information is transmitted from the target mobile terminal to the server center, and further, from the server center to the mobile terminal itself. Moreover, a piece of position information related to the mobile terminal itself is acquired again. Further, on the basis of the new pieces of position information related to the mobile terminal itself and the target mobile terminal, redrawing of the display screen of the mobile terminal is performed.

In the case where the indication of terminating a display on the terminal display screen has been already notified from the user, the direction arithmetic processing section 108 terminates displaying on the terminal display screen.

The above-described search processing enables realization of a method having an advantage in that a user of the mobile terminal feels as if the user were tracing mobile terminals of friends or families thereof, which can be specified by mobile telephone numbers thereof, and directions and distances to the target mobile terminals can be displayed on a destination direction display screen, such as the destination direction display screen according to this embodiment, illustrated in FIG. 17. In this case also, it is possible for a user to intuitively understand position relations from a viewpoint of directions and distances from a current position of the mobile terminal itself to the positions of individual target mobile terminals.

Figure 23:
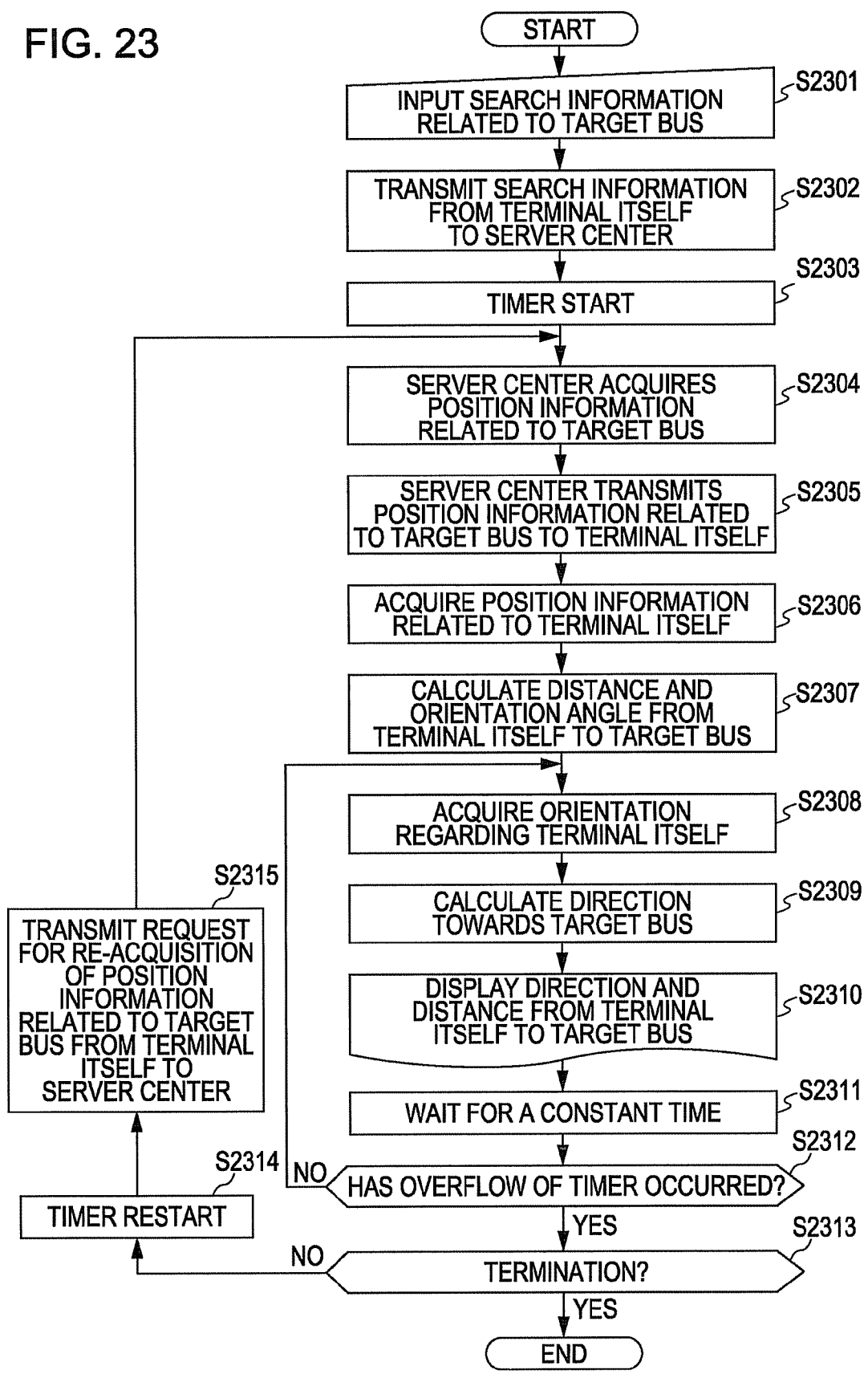
FIG. 23 is an operation flowchart illustrating operations of bus search processing according to an embodiment of the present invention.

FIG. 23 is an operation flowchart illustrating operations of bus search processing, which is jointly performed by an apparatus for providing a position information service according to this embodiment, a server center and a target bus, in the case where a user selects an item denoted by "surrounding bus search" by performing a touch operation, or the like, from among items included in the list of remote search items, displayed on the menu display screen illustrated in FIG. 3.

In this case, a search display screen just like an example of a surrounding facilities search display screen, illustrated in FIG. 5A or 5B, is displayed. An input item to be specified is a name or a code of a bus station. By using this display screen, a user inputs and specifies information related to a bus station, such as a name thereof or a code thereof as a search word (in step S2301 illustrated in FIG. 23).

In addition, in stead of the piece of information related to a bus station, a piece of position information related to a mobile terminal itself may be acquired from the position acquisition section 102, and may be transferred to the search control section 201. In this case, it is unnecessary to provide a search display, and, for example, searching regarding bus stations and target buses existing within a predetermined distance from the position of the mobile terminal itself may be performed.

Responding to this operation, the search control section 201 illustrated in FIG. 2 causes the destination search information input section 103 to enter the input search word or the piece of information related to the mobile terminal itself. Further, the search control section 201 requests the server search executing section 208 to perform search processing on the basis of the search word or the piece of information related to the mobile terminal itself. The server search executing section 208 transmits the search word or the piece of information related to the mobile terminal itself to a server center via a wireless communication network and requests the server center to perform the search (in step S2302 illustrated in FIG. 23). As described above, by performing, for example, a WWW-based access using the HTTP method, the server search executing section 208 establishes a connection between a WWW-based server installed at the server center and an executing section for performing a search for positions of target buses (the executing section being omitted from illustration).

Subsequent to completion of the above-described processes, the direction arithmetic processing section 108 causes a timer, which is configured to perform control of timings at which pieces of position information related to the mobile terminal itself and the target buses are acquired, to start (in step S2303 illustrated in FIG. 23).

On the basis of pieces of information related to bus stations and the piece of information related to the mobile terminal itself, which are notified from the server search executing section 208, the server center specifies a relevant bus station, and acquires a piece of position information related to target buses driving around the specified bus station (in step S2304 illustrated in FIG. 23). Here, for example, pieces of position information are notified on an as needed basis from target buses to the server center.

The server center transmits the pieces of information related to target buses to the mobile terminal itself. Upon receipt of the pieces of information related to the targeted buses, the server search executing section 208 transfers the pieces of information to the search result processing section 104 illustrated in FIG. 1. The search result processing section 104 retains the pieces of position information, i.e., the pieces of longitude and latitude information, related to target buses in the destination information retaining section 105 (these processes being performed in step S2305 illustrated in FIG. 23).

Next, control having been performed by the search result processing section 104 is handed over to the direction arithmetic processing section 108. The direction arithmetic processing section 108 receives a piece of longitude and latitude information related to a current position of the mobile terminal itself from the position acquisition section 102 (in step S2306 illustrated in FIG. 2306).

Next, on the basis of the piece of longitude and latitude information related to the current position of the mobile terminal and the pieces of longitude and latitude information related to the target buses, which are included in the destination information retaining section 105, the direction arithmetic processing section 108 calculates a distance between the mobile terminal itself and individual target buses, and orientation angles viewed from the mobile terminal itself towards individual target buses (in step S2307 illustrated in FIG. 23). This calculation processing can be realized by performing the above-described processing using the formulae (8) and (9).

Next, the orientation arithmetic processing section 108 acquires a piece of orientation information indicating a current orientation regarding the mobile terminal itself from the orientation arithmetic processing section 106 (in step S2308 illustrated in FIG. 23).

Next, the orientation arithmetic processing section 108 calculates a direction towards each of the target buses by calculating a difference $\Delta$ between an orientation angle regarding the mobile terminal itself, corresponding to the acquired piece of orientation information, and the piece of orientation angle regarding each of the target buses (in step S2309 illustrated in FIG. 23). This calculation processing can be realized by performing the above-described processing using the formula (10).

Further, on the display screen coordinate of the mobile terminal itself, the orientation arithmetic processing section 108 displays directions and distances from the mobile terminal itself to individual target buses by causing the orientation regarding the mobile terminal itself to be located in the direction towards the top side of the terminal display screen, and further, displaying an arrow so that the arrow points a direction which is rotated by an angle of $\Delta$ degree from the orientation regarding the mobile terminal itself (in step S2310 illustrated in FIG. 23). The arrow can be displayed, for example, in such the display form as illustrated in FIG. 17. In addition, pieces of information related to the nearest bus station and estimated arrival times regarding target buses may be simultaneously acquired from the server center to be displayed.

Subsequently, the direction arithmetic processing section 108 waits for a constant time (for example, approximately several milliseconds) (in step S2311 illustrated in FIG. 23). Subsequent to elapse of the waiting time, the direction arithmetic processing section 108 determines whether an overflow of a timer has occurred, or not (in step S2312 illustrated in FIG. 23).

In the case where the overflow of the timer has not yet occurred, the direction arithmetic processing section 108 returns the process of flow from step S2312 to the orientation acquisition processing regarding the mobile terminal itself, which is performed in step S2308, and there, acquires an orientation regarding the mobile terminal itself again, and performs redrawing on the terminal display screen on the basis of the new piece of orientation information regarding the mobile terminal itself.

In the case where the overflow of the timer has already occurred, the direction arithmetic processing section 108 determines whether an indication of terminating a display on the terminal display screen has been notified from the user, or not (in step S2313 illustrated in FIG. 23).

In the case where the indication of terminating a display on the terminal display screen has not yet been notified from the user, the direction arithmetic processing section 108 causes the timer to restart (in step S2314 illustrated in FIG. 23). Further, the direction arithmetic processing section 108 transmits a request for re-acquisition of pieces of position information related to the target buses to the server center (in step S2315 illustrated in FIG. 23). As a result of this operation, the process of flow returns to the processing performed in step S2304, and there, pieces of position information related to targeted buses are acquired again. The acquired pieces of position information related to targeted buses are transmitted from the server center to the mobile terminal itself. Moreover, a piece of position information related to the mobile terminal itself is acquired again. Further, on the basis of the new pieces of position information related to the mobile terminal itself and the targeted buses, redrawing of the display screen of the mobile terminal itself is performed.

In the case where the indication of terminating a display on the terminal display screen has been already notified from the user, the direction arithmetic processing section 108 terminates display of target buses on the terminal display screen.

Likewise the case of searching for target mobile terminals, the above-described search processing enables also realization of a method providing an advantage in that a user of the mobile terminal feels as if the user were tracing running buses, and directions and distances to the target buses can be displayed on a destination direction display screen, such as the destination direction display screen according to this embodiment, illustrated in FIG. 17. In this case also, it is possible for a user to intuitively understand position relations from a viewpoint of directions and distances from a current position of the mobile terminal itself to the positions of individual buses. In addition, a display switching may be performed so that directions and distances regarding a plurality of buses each being bound for a different destination direction, are displayed in a listing form, and once one of the buses is specified by performing selection from among the listed buses, displaying using an arrow is performed with respect to a direction, a distance and the like regarding the specified bus.

Operations to be performed in the case where a user selects an item denoted by "surrounding taxi search" from a list of remote access items by performing a touch operation or the like are the same as or similar to those performed in the case of performing the surrounding bus search. In this case, it is unnecessary for users to specify any search words, and a piece of position information related to a mobile terminal it self is acquired by the position acquisition section 102, and is transferred to the search control section 201. As a result of this operation, operations can be performed so that taxies existing within a predetermined distance from the mobile terminal itself are searched for. On the display screen where search results are displayed, for example, telephone numbers and the like regarding taxi companies are displayed, and by using the telephone numbers, users can make phone calls thereto.

In the case of performing the taxi search described above, an advantage the same as or similar to that in the case of performing the bus search can be expected.

Figure 24:
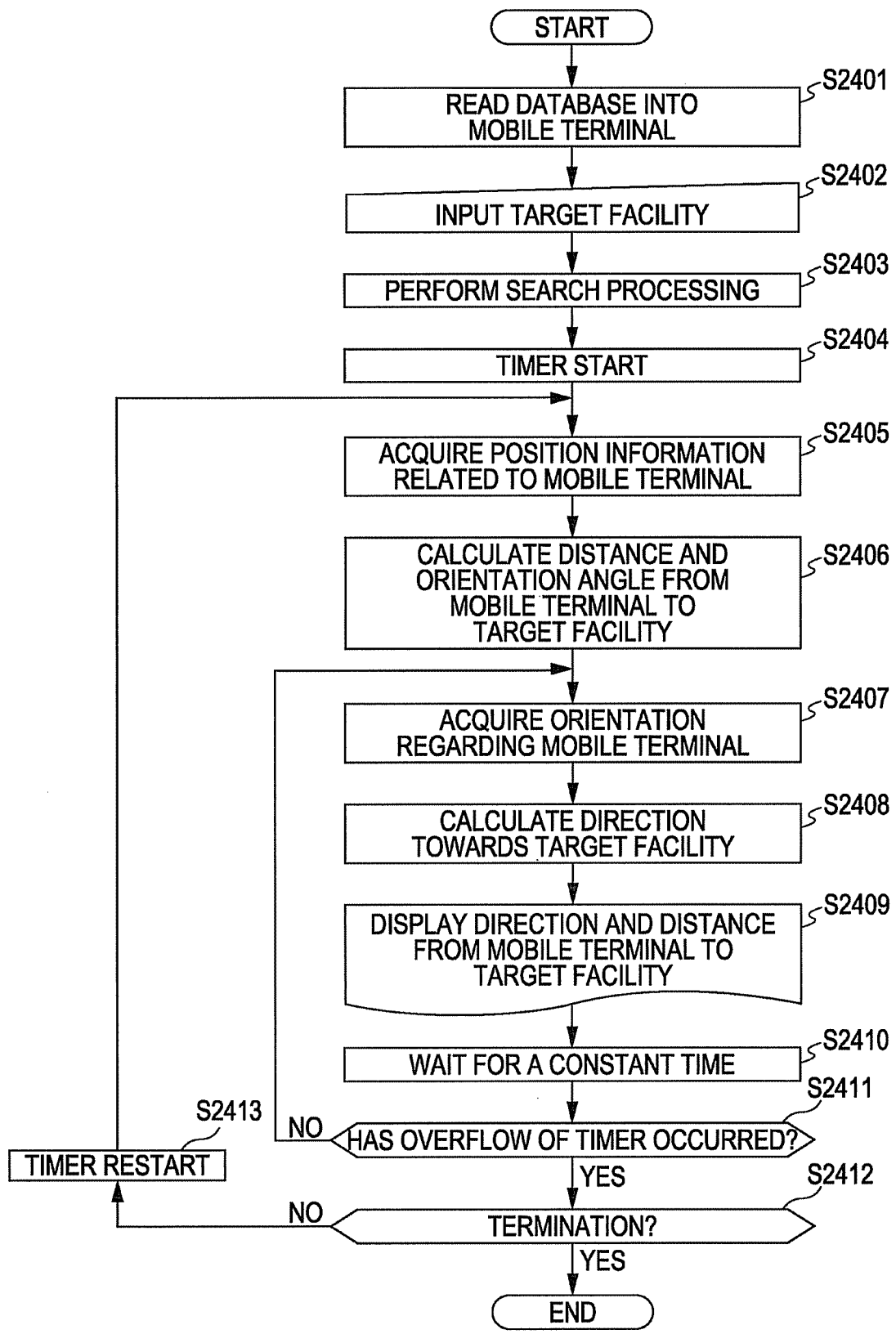
FIG. 24 is an operation flowchart illustrating operations of processing for searching for facilities inside a theme park, according to an embodiment of the present invention.

FIG. 24 is an operation flowchart illustrating operations of processes of searching for facilities inside a theme park, performed by an apparatus for providing a position information service according to this embodiment, in the case where, for example, on a menu display screen illustrated in FIG. 3, a user selects an item denoted by "♣♣ theme-park facility search" from among a list of contents of a local database by performing a touch operation or the like.

In the case where, firstly, for example, when a user enters a theme park or the like, the user places a mobile terminal closely above an IC card reader/writer equipped inside a theme park or the like. Through this operation, the local database retrieval control section 204, illustrated in FIG. 2, causes the contactless communication control section 206 to retrieve a database for searching facilities inside the theme park via the IC card reader/writer, and stores the database into the local database storing section 203 (in step S2401 illustrated in FIG. 24). In addition, the database may be downloaded by the local database retrieval control section 204 from a server center via the server communication control section 205.

Once, further thereto, a relevant menu on the menu display screen illustrated in FIG. 3 is touched, a search display screen just like an example of a surrounding facilities searching display screen illustrated in FIG. 5A or 5B is displayed. An input item to be specified is a name, a code or the like of one of facilities inside the theme park. By using this display screen, a user inputs and specifies a name, a code or the like of a target facility as a search word (in step S2402 illustrated in FIG. 24).

Responding to this operation, the following search processing is performed in step S2403.

That is, firstly, the search control section 201 illustrated in FIG. 2 causes the destination search information input section 103 to enter the input search word. Further, the search control section 201 requests the local database search executing section 202 to perform search processing on the basis of the search word related to the piece of facility information.

Currently, in the local database storing section 203, pieces of data related to positions of facilities inside the theme park, corresponding to names or codes thereof, are stored. The local database storing section 203 sores therein, for example, records corresponding to individual facilities, each including pieces of information, such as a facility name, a facility code, a search category, a piece of longitude and latitude information.

The local database search executing section 202 searches the local database storing section 203 for relevant records on the basis of the notified search word. Further, the local database search executing section 202 notifies groups of facility names, search categories, and pieces of longitude and latitude information, which are created from the searched records, to the search control section 201.

The local database search executing section 202 notifies the search result processing section 104 illustrated in FIG. 1 of the groups of facility names, search categories, and pieces of longitude and latitude information, which are created from the searched records. The search result processing section 104 retains these grouped pieces of information in the destination information retaining section 105.

Subsequent to completion of the above-described processing, control having been performed by the search result processing section 104 is handed over to the direction arithmetic processing section 108. The direction arithmetic processing section 108 illustrated in FIG. 1 causes a timer, which is configured to perform control of timings when pieces of position information related to the mobile terminal are acquired, to start (in step S2404 illustrated in FIG. 24).

Next, the direction arithmetic processing section 108 receives a piece of position information, i.e., a piece of longitude and latitude information, related to the mobile terminal from the position acquisition section 102 (in step S2405 illustrated in FIG. 24).

Next, on the basis of the piece of longitude and latitude information related to the mobile terminal and the pieces of longitude and latitude information related to targeted facilities, which are included in the destination information retaining section 105, the direction arithmetic processing section 108 calculates distances between the mobile terminal and individual target facilities, and orientation angles viewed from the mobile terminal towards individual target facilities (in step S2406 illustrated in FIG. 24). This calculation processing can be realized by performing the above-described processing using the formulae (8) and (9).

Next, the orientation arithmetic processing section 108 acquires a piece of orientation information indicating a current orientation regarding the mobile terminal from the orientation arithmetic processing section 106 (in step S2407 illustrated in FIG. 24).

Next, the orientation arithmetic processing section 108 calculates a direction towards each of the targeted facilities by calculating a difference Δ between an orientation angle regarding the mobile terminal, corresponding to the piece of orientation information, and the orientation angle regarding each of the targeted facilities (in step S2408 illustrated in FIG. 24). This calculation processing can be realized by performing the above-described processing using the formula (10).

Further, on the display screen coordinate of the mobile terminal, the orientation arithmetic processing section 108 displays directions and distances from the mobile terminal to individual target facilities by causing the orientation regarding the mobile terminal to be located in the direction towards the top side of the terminal display screen, and further, displaying an arrow so that the arrow points a direction which is rotated by an angle of Δ degree from the orientation regarding the mobile terminal (in step S2409 illustrated in FIG. 24). The arrow can be displayed, for example, in such the form as illustrated in FIG. 17.

Subsequently, the direction arithmetic processing section 108 waits for a constant time (for example, approximately several milliseconds) (in step S2410 illustrated in FIG. 24). Subsequent to elapse of the waiting time, the direction arithmetic processing section 108 determines whether an overflow of a timer has occurred, or not (in step S2411 illustrated in FIG. 24).

In the case where the overflow of the timer has not yet occurred, the direction arithmetic processing section 108 returns the process of flow from step S2411 to the orientation acquisition processing regarding the mobile terminal, which is performed in step S2407, and there, acquires an orientation regarding the mobile terminal again, and performs redrawing of the terminal display screen on the basis of the new piece of orientation information regarding the mobile terminal.

In the case where the overflow of the timer has already occurred, the direction arithmetic processing section 108 determines whether an indication of terminating a display on the terminal display screen has been notified from the user, or not (in step S2412 illustrated in FIG. 24).

In the case where the indication of terminating a display on the terminal display screen has not yet been notified from the user, the direction arithmetic processing section 108 causes the timer to restart (in step S2413 illustrated in FIG. 24). As a result of this operation, the process of flow returns to the processing performed in step S2405, and there, a piece of position information related to the mobile terminal is acquired again. Further, on the basis of the piece of position information related to the mobile terminal, redrawing of the terminal display screen is performed.

In the case where the indication of terminating a display on the terminal display screen has been already notified from the user, the direction arithmetic processing section 108 terminates displaying of target facilities on the terminal display screen.

The above-described processing for searching for facilities inside a theme park can be easily applied to a guidance service for sightseeing facilities.

In the above-described search for facilities inside a theme park, application of this embodiment enables realization of a display switching which allows switchings between various display screens, such as a display screen in a listing form, and a display screen in a detailed form using an arrow pointing a specific facility, from a viewpoint directions and distances towards individual facilities.

Figure 25:
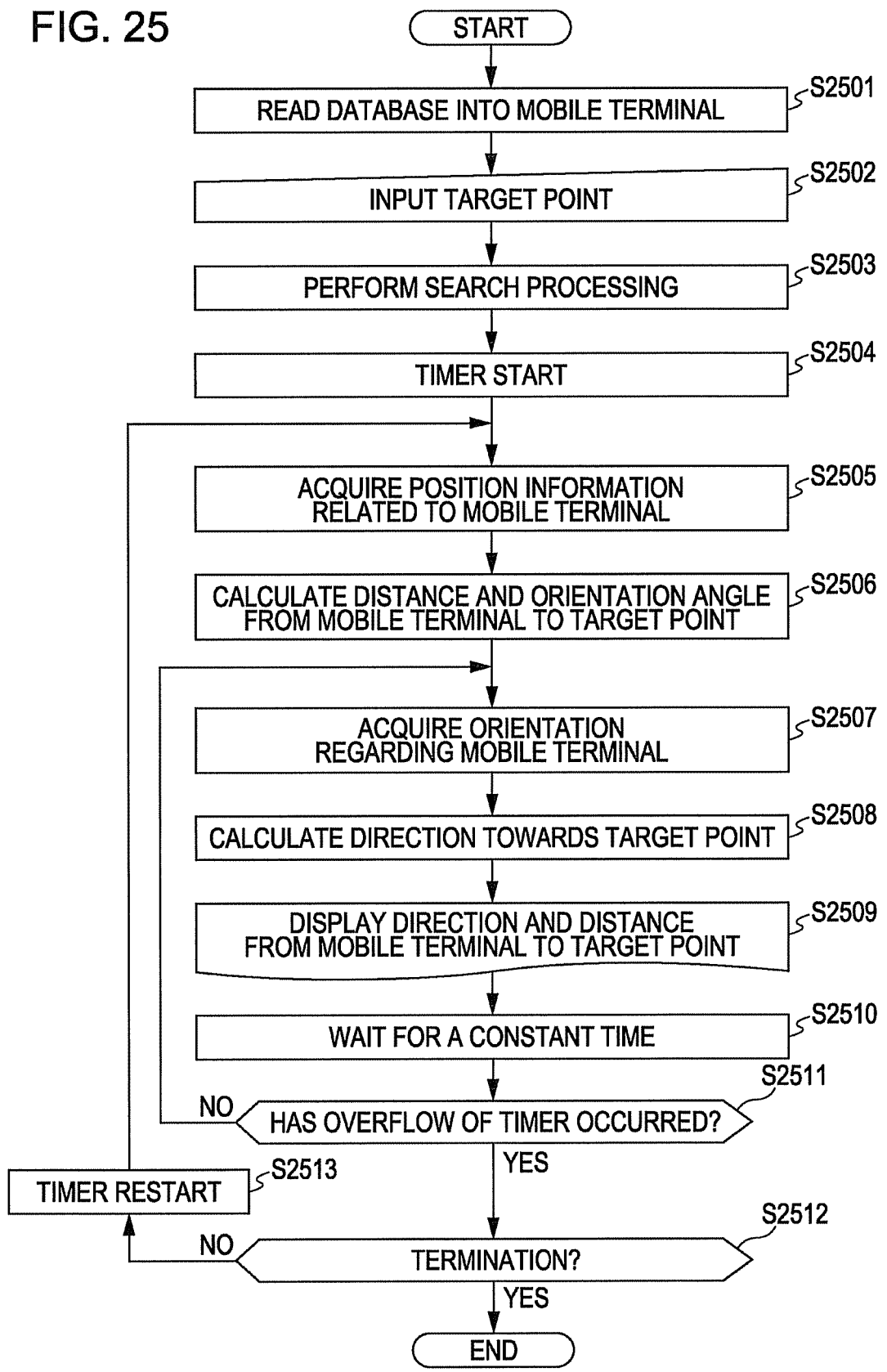
FIG. 25 is an operation flowchart illustrating operations of orienteering point search processing according to an embodiment of the present invention.

FIG. 25 is an operation flowchart illustrating operations of processes of searching for points, performed by an apparatus for providing a position information service according to this embodiment, in the case where, for example, on a menu display screen illustrated in FIG. 3, a user selects an item denoted by "**orienteering navigation" from among items included in a list of contents of a local database by performing a touch operation or the like.

In this case also, likewise the processing for searching for facilities inside a theme park, firstly, for example, when a user enters a venue or the like, the user places a mobile terminal closely above an IC card reader/writer equipped inside the venue or the like. Through this operation, the local database retrieval control section 204, illustrated in FIG. 2, causes the contactless communication control section 206 to retrieve a database for searching points via the IC card reader/writer, and stores the database into the local database storing section 203 (in step S2501 illustrated in FIG. 25). In addition, the database may be downloaded by the local database retrieval control section 204 from a server center via the server communication control section 205.

Once, further thereto, a relevant menu on the menu display screen illustrated in FIG. 3 is touched, a search display screen just like an example of a surrounding facilities searching display screen illustrated in FIG. 5A or 5B is displayed. An input item to be specified is a number, or the like, of one of points inside the venue. By using this display screen, a user inputs and specifies a name, or the like, of a target point as a search word (in step S2502 illustrated in FIG. 25).

Responding to this operation, the following search processing is performed in step S2503.

That is, firstly, the search control section 201 illustrated in FIG. 2 causes the destination search information input section 103 to receive the input search word. Further, the search control section 201 requests the local database search executing section 202 to perform search processing on the basis of the search word related to the point information.

Currently, in the local database storing section 203, pieces of data related to positions of points inside the venue, corresponding to numbers thereof, are stored. The local database storing section 203 sores therein, for example, records corresponding to individual points, each including pieces of information, such as a point number and a piece of longitude and latitude information.

The local database search executing section 202 searches the local database storing section 203 for relevant records on the basis of the notified search word. Further, the local database search executing section 202 notifies groups of point numbers and pieces of longitude and latitude information, which are created from the searched records, to the search control section 201.

The local database search executing section 202 notifies the search result processing section 104 illustrated in FIG. 1 of the groups of point numbers and pieces of longitude and latitude information, which are created from the searched records. The search result processing section 104 retains this grouped information in the destination information retaining section 105.

Subsequent to completion of the above-described processing, control having been performed by the search result processing section 104 is handed over to the direction arithmetic processing section 108. The direction arithmetic processing section 108 illustrated in FIG. 1 causes a timer, which is configured to perform control of timings when pieces of position information related to the mobile terminal are acquired, to start (in step S2504 illustrated in FIG. 25).

Next, the direction arithmetic processing section 108 receives a piece of position information, i.e., a piece of longitude and latitude information, related to the mobile terminal from the position acquisition section 102 (in step S2505 illustrated in FIG. 25).

Next, on the basis of the piece of longitude and latitude information related to the mobile terminal and the piece of longitude and latitude information related to target points, which are retained in the destination information retaining section 105, the direction arithmetic processing section 108 calculates distances between the mobile terminal and individual target points, and orientation angles viewed from the mobile terminal towards individual target points (in step S2506 illustrated in FIG. 25). This calculation processing can be realized by performing the above-described processing using the formulae (8) and (9).

Next, the orientation arithmetic processing section 108 acquires a piece of orientation information indicating a current orientation regarding the mobile terminal from the orientation arithmetic processing section 106 (in step S2507 illustrated in FIG. 25).

Next, the orientation arithmetic processing section 108 calculates a direction towards each of the target positions by calculating a difference Δ between an orientation angle regarding the mobile terminal, corresponding to the piece of orientation information, and the orientation angle regarding each of the target positions (in step S2508 illustrated in FIG. 25). This calculation processing can be realized by performing the above-described processing using the formula (10).

Further, on the display screen coordinate of the mobile terminal, the orientation arithmetic processing section 108 displays directions and distances from the mobile terminal to individual target points by causing the orientation regarding the mobile terminal to be located in the direction towards the top side of the terminal display screen, and further, displaying an arrow so that the arrow points a direction which is rotated by an angle of Δ degree from the orientation regarding the mobile terminal (in step S2509 illustrated in FIG. 25). The arrow can be displayed, for example, in such the display form as illustrated in FIG. 17.

Subsequently, the direction arithmetic processing section 108 waits for a constant time (for example, approximately several milliseconds) (in step S2510 illustrated in FIG. 25).

Subsequent to elapse of the waiting time, the direction arithmetic processing section 108 determines whether an overflow of a timer has occurred, or not (in step S2511 illustrated in FIG. 25).

In the case where the overflow of the timer has not yet occurred, the direction arithmetic processing section 108 returns the process of flow from step S2511 to the orientation acquisition processing regarding the mobile terminal, which is performed in step S2507, and there, acquires an orientation regarding the mobile terminal again, and performs redrawing of the terminal display screen on the basis of the new piece of orientation information regarding the mobile terminal.

In the case where the overflow of the timer has already occurred, the direction arithmetic processing section 108 determines whether an indication of terminating a display on the terminal display screen has been notified from the user, or not (in step S2512 illustrated in FIG. 25).

In the case where the indication of terminating a display on the terminal display screen has not yet been notified from the user, the direction arithmetic processing section 108 causes the timer to restart (in step S2513 illustrated in FIG. 25). As a result of this operation, the process of flow returns to the processing performed in step S2505, and there, a piece of position information related to the mobile terminal is acquired again. Further, on the basis of the piece of position information related to the mobile terminal, redrawing of the terminal display screen is performed.

In the case where the indication of terminating a display on the terminal display screen has been already notified from the user, the direction arithmetic processing section 108 terminates displaying of target points on the terminal display screen.

In applications such as the above-described orienteering navigation, it is particularly effective from a viewpoint of amusement for users that direction and position relations between a current position of the mobile terminal and individual target positions are acquired and displayed on the terminal display screen. From a viewpoint of directions and distances from the mobile terminal to individual target points, applying this embodiment enables realization of a display switching by variously combining display screens such as a display screen in a listing form, as a first display screen, and a display screen in a detailed form using an arrow pointing a specific point, as a second display screen.

In the above-described embodiments, a first display screen is realized as a display screen which allows directions and distances from a current position to destination points to be displayed thereon in various listing forms. This configuration makes it unnecessary for the mobile terminal to retain therein or download map data and the like, and enables high-speed processing and display. In addition, in the case where the mobile terminal is a terminal device having high-performance, depending on an application of the embodiments, the first display screen may be a map-based display screen on which destinations are highlighted. Further, once a destination on a map is selected, a display screen in a detailed form using an arrow may be displayed as a second display screen.

Figure 26:
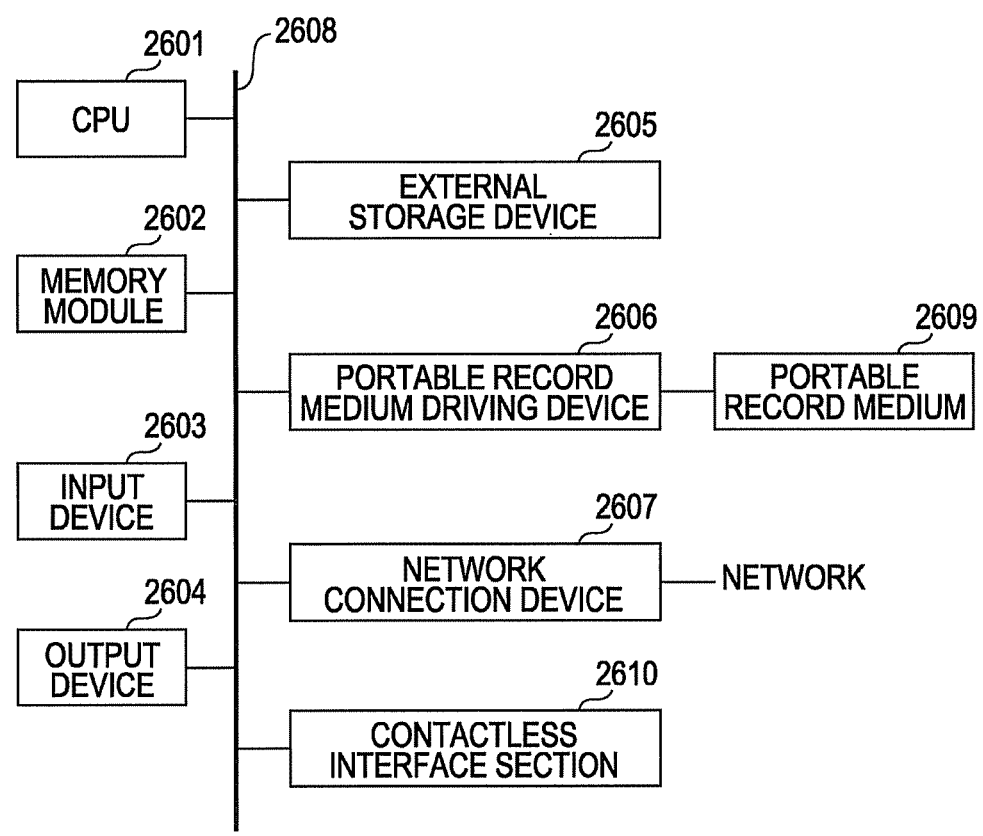
FIG. 26 is a diagram illustrating a hardware configuration of a computer incorporated in a mobile terminal and the like which enables realization of a system according to an embodiment of the present invention.

FIG. 26 is a diagram illustrating an example of a hardware configuration of a computer incorporated in a mobile telephone and the like which enables realization of a system according to the above-described embodiment illustrated in FIGS. 1 and 2. This hardware configuration includes therein a CPU 2601, a memory module 2602, an input device 2603, an output device 2604, an external storage device 2605, a portable record medium driving device 2606 having a portable record medium 2609 inserted thereinto, a network connection device 2607 and a contactless interface section 2603. Further, these elements are mutually connected via a bus 2608. The configuration illustrated in FIG. 26 is just an example of a computer which enables realization of the above-described system, but such a computer is not limited to this configuration.

The CPU 2601 performs control of the whole of the computer. The memory module 2602 is a memory module including RAM chips, or the like, in which, when programs are executed, or data is updated, the programs and the data stored in the external storage device 2605 (or the portable record medium 2609) are temporarily stored. The CPU 2601 performs control of the whole of the computer by reading out the programs into the memory module 2602 and executing the programs.

The input device 2603 includes, for example, a touch panel, a keyboard, a mouse and the like, and further thereto, interface devices therefor. The input device 2603 detects touch operations using the touch panel, and input operations using the keyboard and the mouse, which are performed by users, and notifies the CPU 2601 of the detection results.

The output device 2604 includes a display device, an interface control device therefor and the like. The output device 2604 outputs pieces of data, which are transmitted in accordance with control performed by the CPU 2601, to the display device and the like.

The external storage device 2605 is, for example, a flush ROM module or a hard disk storage device, and is mainly used for storage of various kinds of data and programs.

The portable record medium driving device 2606 is used for incorporating the portable record medium 2605 therein, such as an SDRAM module, a compact flash (trademark), a hard disk device, a CD-ROM disk device, or a DVD disk device, and has a function of supporting the external storage device 2605.

The network connection device 2607 is a device configured to connect with, for example, a communication line such as a local area network (LAN) or a wide area network (WAN).

The contactless interface section 210 reads and writes data from/to an external IC card reader/writer in a contactless condition.

The system according to this embodiment can realized by causing the CPU 2601 to execute programs including functions for individual processing sections to operate. The programs may be stored in, for example, the external storage device 2605 or the portable record medium 2609, and may be delivered therefrom, or may be acquired from a network via the network connection device 2607.

In the above-described embodiments, by allowing users to, when needed, stop and resume operations performed by a GPS receiver functioning as the position acquisition section 102, a geomagnetic sensor functioning as the magnetism acquisition section 107, the acceleration sensor section 110 and the like, it is possible to reduce power consumed in the mobile terminal and the like.

According to a technology disclosed herein, information obtained by performing a search is not merely displayed in a map-based form, but a list of destinations target for the search, each including information related to a direction and a distance from a current position to itself, can be displayed. Further, once a user selects a destination as a target for search from among the listed destinations, subsequently, on the second display screen, which is a second display screen, it is possible for the user to effectively display conditions regarding with what direction relation and how a mobile terminal of the user is moving towards the destination.

As described above, in a technology disclosed herein, a relation between a current position of a terminal device and each of destinations is not merely displayed in a map-based format, but can be displayed from a viewpoint of a direction and a distance from a current position.

Moreover, on a direction and distance display basis, a display condition can be transited at will from a listing display, i.e., a first display screen, to a details display, i.e., a second display screen, which is supported by a function of indicating directions towards destinations, and this display way leads to a visual effect on user's operation.

Technologies disclosed herein can be applied to mobile telephones, mobile wireless information terminals and the like, each incorporating a GPS receiver and a geomagnetic sensor therein.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An apparatus to provide a position information service to display position relation information between a current position and a destination, the apparatus comprising:
    a memory; and
    a processor coupled to the memory, the processor being configured to
    acquire first position information of the current position,
    input search information related to the destination,
    acquire destination alternative information including at least one target position identified by search information related to the destination, the destination alternative information identifying target positions within a predetermined area, and second position information of the at least one target position,
    display first screen information including the destination alternative information and position relation information between the at least one target position and the current position on a display,
    calculate, when the at least one target position displayed on the display is selected from among other target positions, a slope of a viewpoint position of the position relation information in accordance with an inclination of the apparatus with respect to a ground, and
    display second screen information including position relation information between the selected alternative information and the current position on the display so as to keep the position relation information in a horizontal state with respect to the ground.

2. The apparatus according to claim 1, wherein the second screen information is a visual direction information of the position relation information between the destination alternative information and the current position.

3. The apparatus according to claim 2, wherein the visual direction information is an image of an arrow indicating the selected target position.

4. The apparatus according to claim 1, wherein the processor is further configured to acquire the position relation information between the at least one target position and the current position based on the at least the first position information and the second position information.

5. The apparatus according to claim 1, wherein the processor is further configured to acquire orientation information of the apparatus, and
    adjust the position relation information between the at least one target position and the current position based on the orientation information, and the display displays the adjusted position relation information.

6. The apparatus according to claim 1, wherein at least one of the first and the second screen information is displayed by means of widget drawing.

7. The apparatus according to claim 1, further comprising an acceleration sensor section which outputs gravity vector information of the apparatus, and
    the processor is further configured to adjust the position relation information between the at least one target position and the current position based on the gravity vector information, and the display displays the adjusted position relation information.

8. The apparatus according to claim 1, wherein the processor is further configured to display, on the display, a first icon representing the current position and at least a second icon representing the at least one target position so as to display the position relation information in a distance and a direction of the at least one target position relative to the current position.

9. The apparatus according to claim 1, further comprising:
    a local storage which records a database including the destination alternative information, wherein
    the processor is further configured to search and acquire the destination alternative information from the database based on the search information and the current position.

10. The apparatus according to claim 9, further comprising a retrieval controller configured to retrieve an outer database to be at least a part of the database to the local storage.

11. The apparatus according to claim 10, further comprising a contactless communication controller connected to the retrieval controller, the retrieval controller being configured to retrieve the outer database via the contactless communication controller.

12. The apparatus according to claim 10, further comprising a drive connected to the retrieval controller, which reads a data recorded on a portable record medium, the retrieval controller being configured to retrieve the outer database via the drive.

13. The apparatus according to claim 10, further comprising a server communication controller connected to the retrieval controller, the retrieval controller being configured to retrieve the outer database via the server communication controller.

14. The apparatus according to claim 1, wherein the processor is further configured to cause a server apparatus to transmit the at least one target position to a search processor.

15. The apparatus according to claim 14, wherein the processor is connected to a server apparatus via a network, and the server apparatus manages a database, the processor being further configured to cause the database to transmit the at least one target to the search processor.

16. The apparatus according to claim 14, wherein the processor is connected to a server apparatus via a network, and the server apparatus manages a mobile terminal device or a mobile vehicle device, the processor being further configured to cause the mobile terminal device or the mobile vehicle device to transmit the at least one target to the search processor.

17. The apparatus according to claim 1, wherein the processor is further configured to output a listing of target positions, arranged based on both direction and distance from the current position, to select from.

18. The apparatus according to claim 1, wherein position information including orientation angles are calculated for the other targets positions of the acquired destination alternative information, and the second screen information creates a visual effect based on an orientation angle of the apparatus, the current position, and the calculated orientation angles of the other target positions within the predetermined area to display the target position and other target positions within the predetermine area from a user perspective.

19. A method to provide a position information service to display position relation information between a current position and a destination, comprising:

acquiring first position information of the current position;
inputting search information related to the destination;
acquiring destination alternative information including at least one target position identified by search information related to the destination, the destination alternative information identifying target positions within a predetermined area, and second position information of the at least one target position;
displaying first screen information including the destination alternative information and position relation information between the at least one target position and the current position on a display;
calculating, when the at least one target position displayed on the display is selected from among other target positions, a slope of a viewpoint position of the position relation information in accordance with an inclination of the apparatus with respect to a ground; and
displaying a second screen information is output including the position relation information between the selected alternative information and the current position on the display so as to keep the position relation information in a horizontal state with respect to the ground.

20. The method according to claim 19, wherein the outputting outputs a listing of target positions, arranged based on both direction and distance from the current position, to select from.

21. A non-transitory computer readable storage medium that stores therein a program to provide a position information service to display a position relation between a current position and a destination, the program performing a process comprising:

acquiring first position information of the current position;
inputting search information related to the destination;
acquiring destination alternative information including at least one target position identified by search information related to the destination, the destination alternative information identifying target positions within a predetermined area, and second position information of the at least one target position;
displaying first screen information including the destination alternative information and position relation information between the at least one target position and the current position on a display;
calculating, when the at least one target position displayed on the display is selected from among a plurality of target positions, a slope of a viewpoint position of the position relation information in accordance with an inclination of the apparatus with respect to a ground; and
displaying a second screen information is output including the position relation information between the selected alternative information and the current position on the display so as to keep the position relation information in a horizontal state with respect to the ground.

22. The non-transitory computer readable storage medium according to claim 21, wherein the outputting outputs a listing of target positions, arranged based on both direction and distance from the current position, to select from.

\* \* \* \* \*

UNITED STATES PATENT AND TRADEMARK OFFICE
CERTIFICATE OF CORRECTION

| | | |
|---|---|---|
| PATENT NO. | : 9,074,898 B2 | Page 1 of 1 |
| APPLICATION NO. | : 12/730620 | |
| DATED | : July 7, 2015 | |
| INVENTOR(S) | : Yumiko Ozawa et al. | |

It is certified that error appears in the above-identified patent and that said Letters Patent is hereby corrected as shown below:

IN THE CLAIMS

Claim 19, Column 35, Line 36

Delete "information is output" and insert --information--, therefor.

Claim 21, Column 36, Line 28 (Approximately)

Delete "information is output" and insert --information--, therefor.

Signed and Sealed this
Thirteenth Day of October, 2015

Michelle K. Lee
*Director of the United States Patent and Trademark Office*